(12) United States Patent
Arai et al.

(10) Patent No.: US 10,895,779 B2
(45) Date of Patent: Jan. 19, 2021

(54) LIQUID CRYSTAL DISPLAY WITH RED, GREEN, BLUE, AND WHITE SUBPIXELS HAVING REFLECTIVE AND TRANSMISSIVE AREAS

(71) Applicant: TOPPAN PRINTING CO., LTD., Tokyo (JP)

(72) Inventors: Norihiro Arai, Tokyo (JP); Kunpei Kobayashi, Tokyo (JP); Ryota Mizusako, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/522,153

(22) Filed: Jul. 25, 2019

(65) Prior Publication Data

US 2019/0348006 A1 Nov. 14, 2019

Related U.S. Application Data

(63) Continuation of application No. PCT/JP2018/002235, filed on Jan. 25, 2018.

(30) Foreign Application Priority Data

Jan. 27, 2017 (JP) .................................. 2017-013357

(51) Int. Cl.
*G02F 1/1335* (2006.01)
*G02F 1/133* (2006.01)
(Continued)

(52) U.S. Cl.
CPC .... *G02F 1/133555* (2013.01); *G02F 1/13318* (2013.01); *G02F 1/133514* (2013.01);
(Continued)

(58) Field of Classification Search
CPC ......... G09G 3/3607; G09G 2300/0452; G09G 2300/0456; G09G 2320/0626;
(Continued)

(56) References Cited

U.S. PATENT DOCUMENTS

2003/0025977 A1    2/2003   Takizawa et al.
2004/0150771 A1*   8/2004   Lee ....................... G02F 1/1368
                                                            349/114
(Continued)

FOREIGN PATENT DOCUMENTS

JP    2005-234604    9/2005
JP    2006-276108    10/2006
(Continued)

OTHER PUBLICATIONS

International Search Report dated May 1, 2018, in corresponding International Patent Application No. PCT/JP2018/002235.
(Continued)

*Primary Examiner* — Darlene M Ritchie

(57) ABSTRACT

A liquid crystal display includes a pixel comprising first to fourth sub-pixels capable of respectively displaying red, green, blue, and white. Each of the sub-pixels comprises a reflective area and a transmissive area. The liquid crystal display includes a first laminated member provided on a first substrate and a second laminated member provided on a second substrate. The first laminated member comprises a first retardation plate and a first polarizer. The second laminated member comprises a second retardation plate, a diffusion member for diffusing light, and a second polarizer.

9 Claims, 16 Drawing Sheets

(51) Int. Cl.
  G02F 1/1337   (2006.01)
  G02F 1/1343   (2006.01)
  G09G 3/36     (2006.01)
  G02F 1/1368   (2006.01)
  G02F 1/1362   (2006.01)
  G02F 1/13363  (2006.01)

(52) U.S. Cl.
  CPC .. G02F 1/133528 (2013.01); G02F 1/133553 (2013.01); G02F 1/133753 (2013.01); G02F 1/134309 (2013.01); G09G 3/3607 (2013.01); G02F 1/1368 (2013.01); G02F 1/133504 (2013.01); G02F 1/133707 (2013.01); G02F 1/136227 (2013.01); G02F 2001/133541 (2013.01); G02F 2001/133638 (2013.01); G02F 2001/133742 (2013.01); G02F 2001/134345 (2013.01); G02F 2201/121 (2013.01); G02F 2201/123 (2013.01); G02F 2201/52 (2013.01); G02F 2203/09 (2013.01); G09G 2300/0452 (2013.01); G09G 2300/0456 (2013.01); G09G 2320/0626 (2013.01); G09G 2340/06 (2013.01); G09G 2360/144 (2013.01)

(58) Field of Classification Search
  CPC .......... G09G 2340/06; G09G 2360/144; G02F 1/13318; G02F 1/133514; G02F 1/133528; G02F 1/133553; G02F 1/133753; G02F 1/134309; G02F 1/1368; G02F 1/136227; G02F 1/133707; G02F 1/133555; G02F 1/133504; G02F 2001/133541; G02F 2001/133742; G02F 2001/134345; G02F 2001/133638; G02F 2201/121; G02F 2201/123; G02F 2201/52; G02F 2203/09
  See application file for complete search history.

(56) References Cited

U.S. PATENT DOCUMENTS

| | | | |
|---|---|---|---|
| 2006/0215088 | A1 | 9/2006 | Kamijo et al. |
| 2012/0147284 | A1* | 6/2012 | Kim ................ G02F 1/133555 349/43 |
| 2012/0206513 | A1 | 8/2012 | Ueno |
| 2015/0185556 | A1* | 7/2015 | Arai ................ G02F 1/1368 349/43 |
| 2015/0243224 | A1* | 8/2015 | Zhuang ............ G09G 3/3406 345/102 |
| 2016/0260393 | A1* | 9/2016 | Chen ................ G09G 3/3685 |
| 2019/0339556 | A1* | 11/2019 | Yoshida .......... G02F 1/136286 |

FOREIGN PATENT DOCUMENTS

| | | |
|---|---|---|
| JP | 2010-122707 A | 6/2010 |
| JP | 5029266 | 9/2012 |
| JP | 2013-137547 | 7/2013 |
| JP | 2013-200571 | 10/2013 |
| JP | 2016-218211 | 12/2016 |
| WO | 2011/061966 | 5/2011 |

OTHER PUBLICATIONS

Written Opinion of the International Searching Authority dated May 1, 2018 in corresponding International Patent Application No. PCT/JP2018/002235.

English Translation by WIPO of the International Preliminary Report on Patentability dated Aug. 8, 2019 in corresponding International Patent Application No. PCT/JP2018/002235.

First Office Action dated Sep. 29, 2020 in corresponding Japanese Patent Application No. 2017-013357 (5 pages) (3 pages English Translation).

* cited by examiner

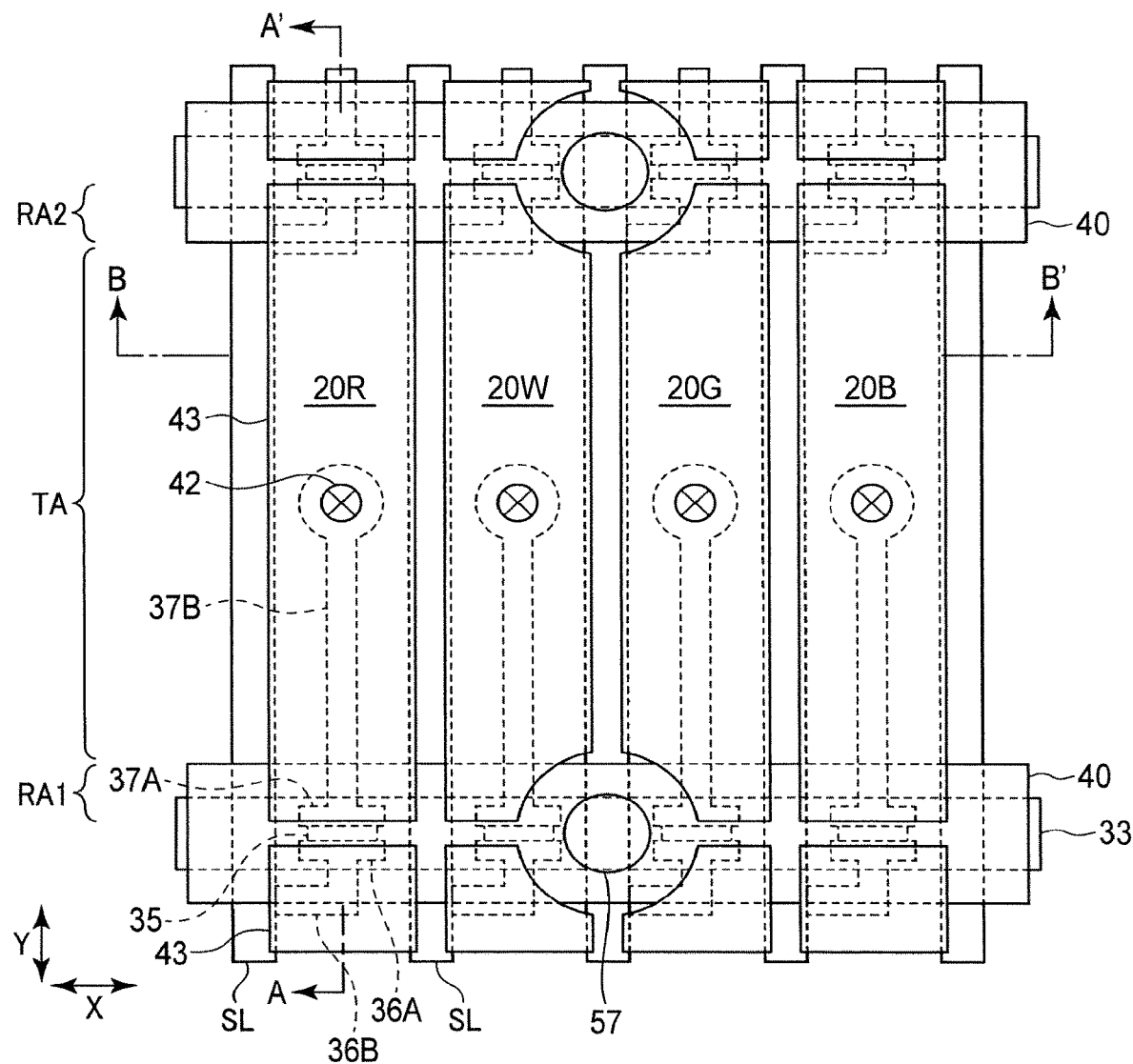
F I G. 3

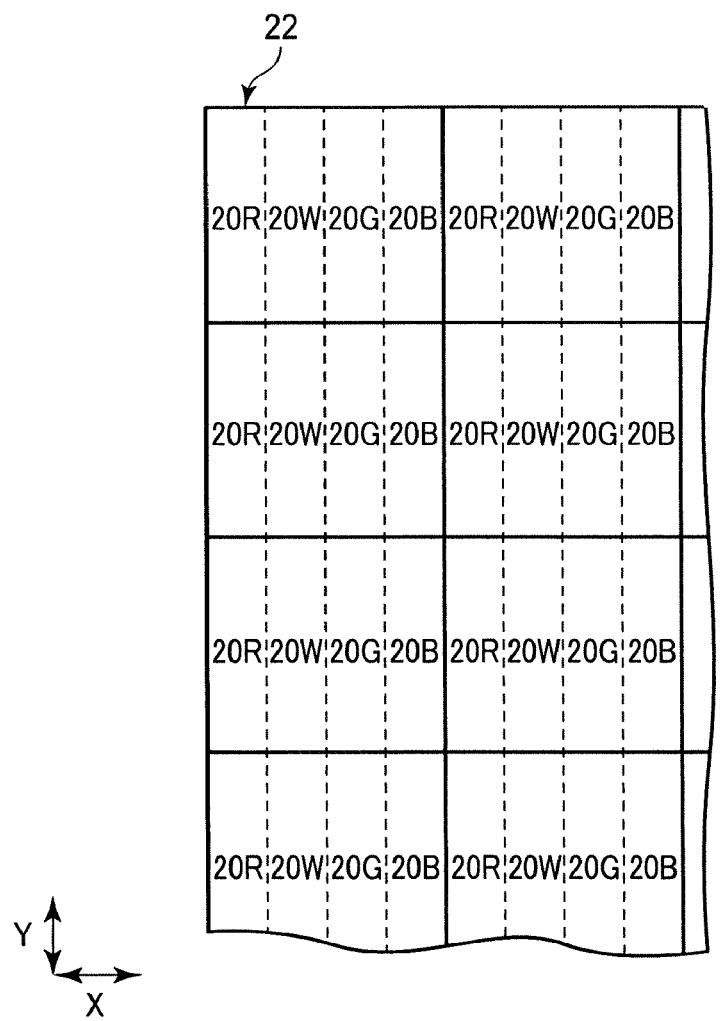
F I G. 8

64 GRADATION LEVELS

| | INPUT SIGNAL | | | CONVERSION SIGNAL | | | |
|---|---|---|---|---|---|---|---|
| | $d_R$ | $d_G$ | $d_B$ | $D_R$ | $D_G$ | $D_B$ | $D_W$ |
| GRADATION LEVEL | 0 | 0 | 0 | 0 | 0 | 0 | 0 |
| | 63 | 0 | 0 | 63 | 0 | 0 | 0 |
| | 0 | 63 | 0 | 0 | 63 | 0 | 0 |
| | 0 | 0 | 63 | 0 | 0 | 63 | 0 |
| | 63 | 63 | 0 | 63 | 63 | 0 | 0 |
| | 0 | 63 | 63 | 0 | 63 | 63 | 0 |
| | 63 | 0 | 63 | 63 | 0 | 63 | 0 |
| | 31 | 12 | 2 | 31 | 12 | 2 | 0 |
| | 43 | 56 | 43 | 43 | 56 | 43 | 26 |
| | 23 | 3 | 60 | 23 | 3 | 60 | 1 |
| | 63 | 63 | 63 | 63 | 63 | 63 | 63 |

FIG. 12

| | CF CONFIGURATION | REFLECTION TRANSMISSION | CF COLOR SPECIFICATION | THICKNESS OF LIQUID CRYSTAL LAYER |
|---|---|---|---|---|
| COMPARATIVE EXAMPLE 1 | R,G,B | A:B | NTSC RATIO 50% | 3.8 μm |
| EMBODIMENT 1 | R,G,B,W | A:B | NTSC RATIO 50% | 3.8 μm |

A:TRANSISTOR AREA
B:TRANSMISSIVE AREA

FIG. 13

| | REFLECTANCE (RELATIVE VALUE) | TRANSMITTANCE (RELATIVE VALUE) | COLOR REPRODUCIBILITY (TRANSMISSIVE) |
|---|---|---|---|
| COMPARATIVE EXAMPLE 1 | 1.0 | 1.0 | NTSC RATIO 50% |
| EMBODIMENT 1 | 1.3 | 1.3 | NTSC RATIO 50% |

FIG. 14

$\alpha=0.0048$, 64 GRADATION LEVELS

| | INPUT SIGNAL | | | CONVERSION SIGNAL | | | |
|---|---|---|---|---|---|---|---|
| | $d_R$ | $d_G$ | $d_B$ | $D_R$ | $D_G$ | $D_B$ | $D_W$ |
| GRADATION LEVEL | 0 | 0 | 0 | 0 | 0 | 0 | 0 |
| | 63 | 0 | 0 | 63 | 0 | 0 | 0 |
| | 0 | 63 | 0 | 0 | 63 | 0 | 0 |
| | 0 | 0 | 63 | 0 | 0 | 63 | 0 |
| | 63 | 63 | 0 | 63 | 63 | 0 | 0 |
| | 0 | 63 | 63 | 0 | 63 | 63 | 0 |
| | 63 | 0 | 63 | 63 | 0 | 63 | 0 |
| | 31 | 12 | 2 | 31 | 12 | 2 | 0 |
| | 43 | 56 | 43 | 43 | 56 | 43 | 30 |
| | 23 | 3 | 60 | 23 | 3 | 60 | 1 |
| | 63 | 63 | 63 | 63 | 63 | 63 | 63 |

F I G. 15

$\alpha=0.0159$, 64 GRADATION LEVELS

| | INPUT SIGNAL | | | CONVERSION SIGNAL | | | |
|---|---|---|---|---|---|---|---|
| | $d_R$ | $d_G$ | $d_B$ | $D_R$ | $D_G$ | $D_B$ | $D_W$ |
| GRADATION LEVEL | 0 | 0 | 0 | 0 | 0 | 0 | 0 |
| | 63 | 0 | 0 | 63 | 0 | 0 | 0 |
| | 0 | 63 | 0 | 0 | 63 | 0 | 0 |
| | 0 | 0 | 63 | 0 | 0 | 63 | 0 |
| | 63 | 63 | 0 | 63 | 63 | 0 | 0 |
| | 0 | 63 | 63 | 0 | 63 | 63 | 0 |
| | 63 | 0 | 63 | 63 | 0 | 63 | 0 |
| | 31 | 12 | 2 | 31 | 12 | 2 | 0 |
| | 43 | 56 | 43 | 43 | 56 | 43 | 41 |
| | 23 | 3 | 60 | 23 | 3 | 60 | 2 |
| | 63 | 63 | 63 | 63 | 63 | 63 | 63 |

F I G. 16

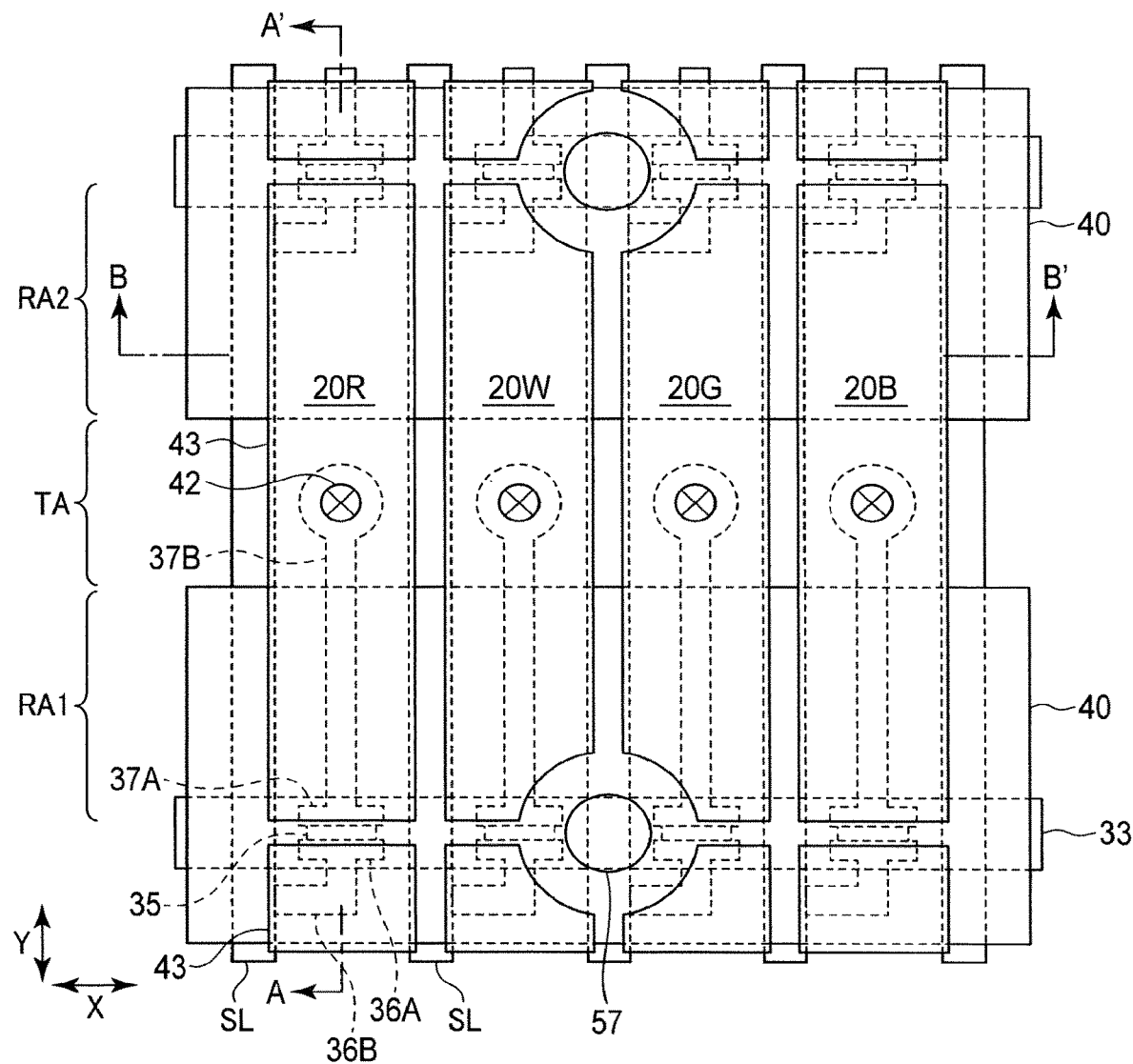
F I G. 17

| | CF CONFIGURATION | REFLECTION TRANSMISSION | CF COLOR SPECIFICATION | THICKNESS OF LIQUID CRYSTAL LAYER |
|---|---|---|---|---|
| COMPARATIVE EXAMPLE 2 | R,G,B | (A+0.75B):0.25B | NTSC RATIO 20% | 2.0 μm |
| EMBODIMENT 2 | R,G,B,W | (A+0.75B):0.25B | NTSC RATIO 20% | 2.0 μm |

A:TRANSISTOR AREA
B:TRANSMISSIVE AREA

F I G. 20

| | REFLECTANCE (RELATIVE VALUE) | TRANSMITTANCE (RELATIVE VALUE) | COLOR REPRODUCIBILITY (TRANSMISSIVE) |
|---|---|---|---|
| COMPARATIVE EXAMPLE 2 | 1.0 | 1.0 | NTSC RATIO 20% |
| EMBODIMENT 2 | 1.3 | 1.3 | NTSC RATIO 20% |

F I G. 21

LIQUID CRYSTAL DISPLAY WITH RED, GREEN, BLUE, AND WHITE SUBPIXELS HAVING REFLECTIVE AND TRANSMISSIVE AREAS

CROSS-REFERENCE TO RELATED APPLICATIONS

This application is a Continuation Application of PCT Application No. PCT/JP2018/002235, filed Jan. 25, 2018, and based upon and claiming the benefit of priority from Japanese Patent Application No. 2017-013357, filed Jan. 27, 2017, the entire contents of all of which are incorporated herein by reference.

FIELD

The present invention relates to a liquid crystal display, and specifically to a semi-transmissive liquid crystal display that can realize both transmissive display and reflective display.

BACKGROUND

A semi-transmissive liquid crystal display capable of displaying images in both transmission mode and reflection mode has been known as a liquid crystal display for improving outdoor visibility. In such a semi-transmissive liquid crystal display, a reflective metal film provided inside a liquid crystal cell is patterned to form a reflective area and a transmissive area so that each display pixel is divided into a reflective area and a transmissive area. By varying the ratio of the reflective area to the transmissive area, the optical characteristics can be optimized. The optical characteristics are further optimized by arranging a transparent step film or the like in the reflective area and thereby varying the cell gap (multi-gap structure) between the reflective area and the transmissive area.

In the liquid crystal display including such multiple gaps, a step created between the reflective area and the transmissive area may cause an alignment defect at the boundary of the steps. Furthermore, light may leak from the boundary of the steps. This leads to a reduction in contrast ratio. If the stepped portion is shielded to suppress the reduction in contrast ratio, it will end up in a decrease in the effective aperture ratio.

To change the cell gap, a transparent step film is required in the reflective area. This increases the manufacturing steps in comparison with a transmissive liquid crystal display or the like. In addition, when forming a transparent step film in the reflective areas, the arrangement of the reflective areas may be restricted; for example, the reflective areas may be arranged in a certain region. Particularly, a high definition panel that exceeds 300 pixels per inch (ppi) is highly susceptible to the above, and therefore it is very difficult to realize a high definition panel of a semi-transmissive type.

SUMMARY

According to a first aspect of the present invention, there is provided a liquid crystal display, comprising: first and second substrates; a liquid crystal layer interposed between the first and second substrates; a pixel comprising first to fourth sub-pixels capable of respectively displaying red, green, blue, and white, each of the first to fourth sub-pixels comprising a reflective area and a transmissive area; a switching element provided on the first substrate to correspond to the sub-pixel; a reflective film provided in the reflective area above the switching element with an insulating film interposed in-between; a pixel electrode provided in the reflective area and the transmissive area above the reflective film with an insulating film interposed in-between; a red filter, a green filter, a blue filter, and a white filter provided on the second substrate to correspond to the first to fourth sub-pixels, respectively; a first laminated member provided on an opposite side of the first substrate with respect to the liquid crystal layer, the first laminated member comprising a first retardation plate and a first polarizer; and a second laminated member provided on an opposite side of the second substrate with respect to the liquid crystal layer, the second laminated member comprising a second retardation plate, a diffusion member for diffusing light, and a second polarizer.

BRIEF DESCRIPTION OF THE DRAWINGS

FIG. 3 is a plan view of the display panel according to the first embodiment.
FIG. 8 is a schematic diagram of an example pixel array.
FIG. 12 is a diagram that explains a gradation data conversion operation.
FIG. 13 is a diagram that explains example specifications of the liquid crystal display according to the first embodiment.
FIG. 14 is a diagram that explains the properties of the liquid crystal display according to the first embodiment.
FIG. 15 is a diagram that explains a gradation data conversion operation.
FIG. 16 is a diagram that explains a gradation data conversion operation.
FIG. 17 is a plan view of a display panel according to the second embodiment.
FIG. 20 is a diagram that explains example specifications of the liquid crystal display according to a second embodiment.
FIG. 21 is a diagram that explains the properties of the liquid crystal display according to the second embodiment.

DETAILED DESCRIPTION

A description will now be given of the embodiments with reference to the accompanying drawings. It should be noted that the drawings are schematic or conceptual, and the dimensions and scales of the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited by the element shapes, structures, arrangements, etc. described below. In the description below, structural elements having substantially the same functions and configurations will be denoted by the same reference symbols, and a repetitive description of such elements will be given only where necessary.

First Embodiment

[1] Overall Structure of Liquid Crystal Display

Figure 1:
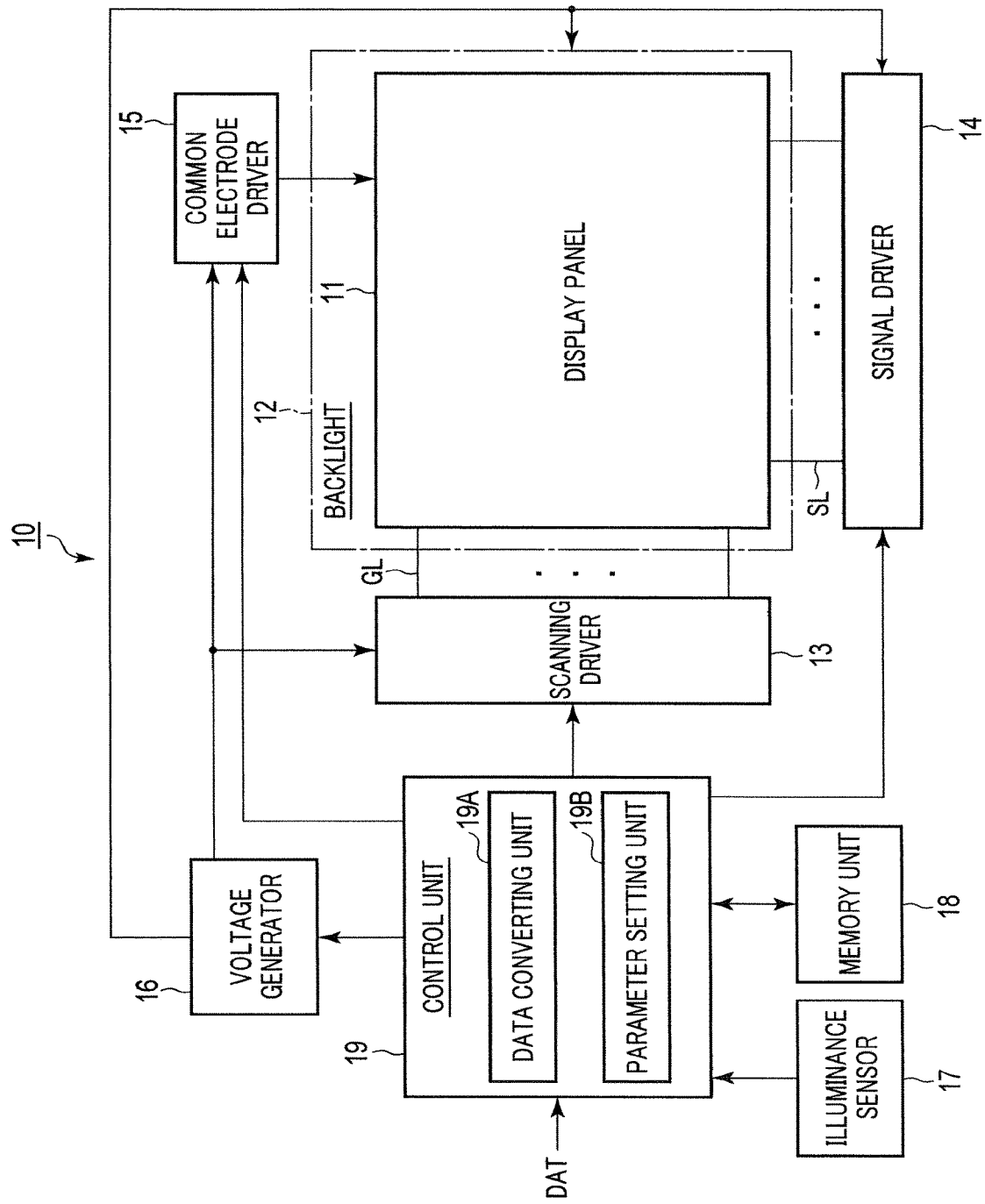
FIG. 1 is a block diagram of a liquid crystal display according to a first embodiment.

FIG. 1 is a block diagram of a liquid crystal display device 10 according to a first embodiment of the present invention. The liquid crystal display device 10 includes a display panel 11, a backlight (illuminating device) 12, a scanning driver (scan line driving circuit) 13, a signal driver (signal line driving circuit) 14, a common electrode driver (common electrode driving circuit) 15, a voltage generator 16, an illuminance sensor 17, a memory unit 18, and a control unit 19.

The display panel 11 includes a pixel array in which a plurality of sub-pixels are arranged in a matrix. As described later, one display element (pixel) is composed of four sub-pixels, namely red, green, blue, and white sub-pixels. In the display panel 11, a plurality of scan lines GL each extending in the row direction (X direction) and a plurality of signal lines SL each extending in the column direction (Y direction) are disposed. In the intersection regions of the scan lines GL and the signal lines SL, sub-pixels are arranged.

The backlight 12 is a surface light source for illuminating the back surface of the display panel 11. As the backlight 12, an LED backlight of a direct type or of a side light type (edge light type) is used.

The scanning driver 13 is connected to a plurality of scan lines GL. In accordance with the vertical control signal sent from the control unit 19, the scanning driver 13 sends, to the display panel 11, a scanning signal for turning on/off the switching element included in the sub-pixel.

The signal driver 14 is connected to a plurality of signal lines SL. The signal driver 14 receives horizontal control signals and display data from the control unit 19. The signal driver 14 sends a gradation signal (drive voltage) corresponding to the display data to the display panel 11 in accordance with the horizontal control signal.

The common electrode driver 15 generates a common voltage Vcom, and supplies the common voltage Vcom to the display panel 11. The voltage generator 16 generates various voltages required for the operation of the liquid crystal display device 10 and supplies them to each circuit.

The illuminance sensor 17 measures the illuminance of the ambient environment of the liquid crystal display device 10. The illuminance sensor 17 can be attached at any desired position.

The memory unit 18 may include a volatile memory and a nonvolatile memory. The memory unit 18 serves as a work area of the control unit 19. Furthermore, the memory unit 18 stores a program used for the control executed by the control unit 19, in a nonvolatile manner. The control unit 19 can execute the control, which will be described later, using the program stored in the memory unit 18.

The control unit 19 receives the video data DAT from the outside. The control unit 19 generates various control signals based on the video data DAT, and sends these control signals to the circuits. The control unit 19 includes a data converting unit 19A and a parameter setting unit 19B.

The data converting unit 19A generates the gradation data necessary for the display operation of sub-pixels, using the video data DAT. Specifically, the video data DAT includes three-color gradation data of red, green, and blue for each pixel. The data converting unit 19A converts the three-color gradation data of red, green, and blue into four-color gradation data of red, green, blue, and white. The pixels are driven based on the four-color gradation data.

The parameter setting unit 19B receives the illuminance data measured by the illuminance sensor 17. The parameter setting unit 19B uses the illuminance data to set a parameter α for displaying a video image.

[2] Circuit Configuration of Pixels

Figure 2:
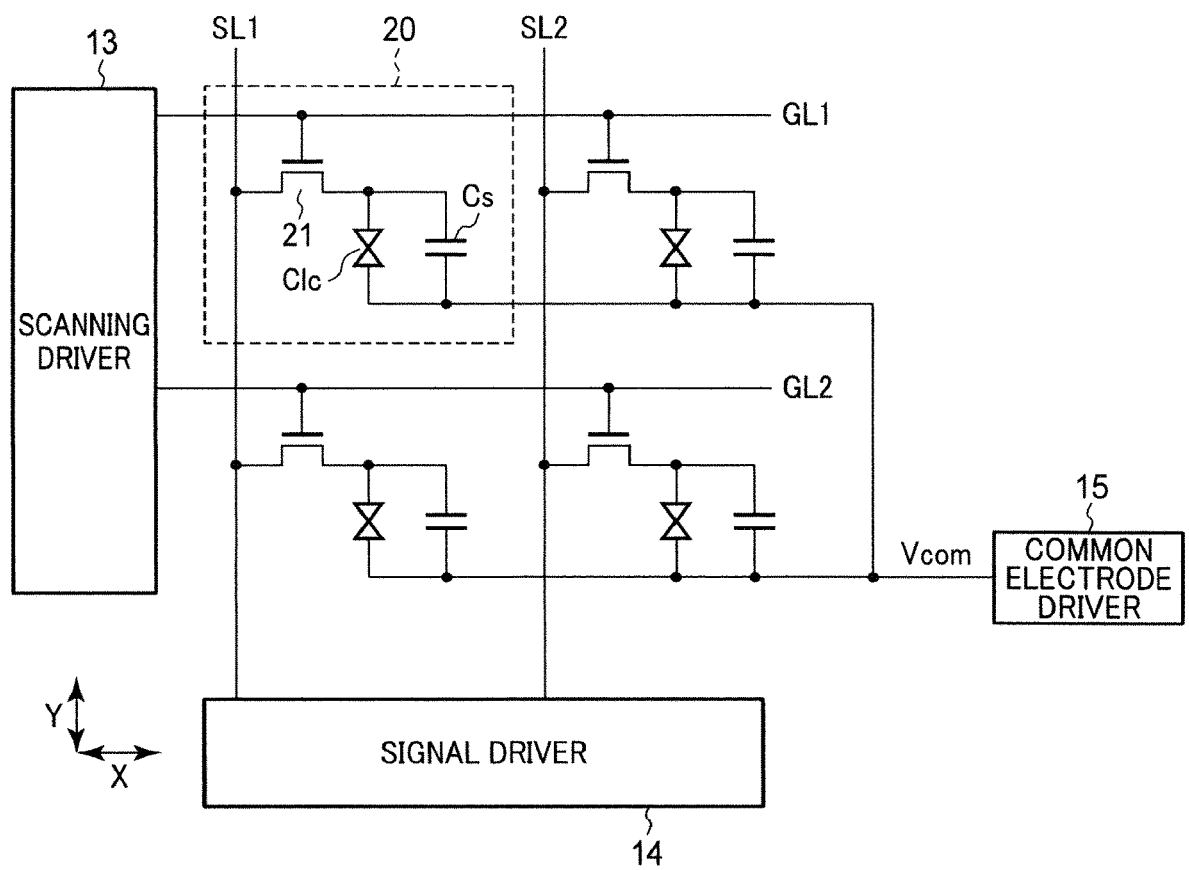
FIG. 2 is a circuit diagram of a display panel according to the first embodiment.

Next, the circuit configuration of a pixel included in the display panel 11 will be described. FIG. 2 is a circuit diagram of the display panel 11 shown in FIG. 1. Four sub-pixels are focused on in FIG. 2.

A sub-pixel 20 includes a switching element (active element) 21, a liquid crystal capacitance (liquid crystal element) Clc, and a storage capacitance Cs. As the switching element 21, a thin film transistor (TFT) may be adopted, and an n-channel TFT may be adopted.

The TFT 21 is provided with a source that is electrically connected to the signal line SL, a gate that is electrically connected to the scan line GL, and a drain that is electrically connected to the liquid crystal capacitance Clc. The liquid crystal capacitance Clc that serves as a liquid crystal element is constituted by a pixel electrode, a common electrode, and a liquid crystal layer interposed in-between.

The storage capacitance Cs is connected in parallel to the liquid crystal capacitance Clc. The storage capacitance Cs has functions of suppressing the potential fluctuation that tends to occur in the pixel electrode and maintaining the drive voltage applied to the pixel electrode until the drive voltage corresponding to the next signal is applied. The storage capacitance Cs is constituted by a pixel electrode, a storage electrode (storage capacitance line), and an insulating film interposed in-between. The common voltage Vcom is applied to the common electrode and the storage electrode by the common electrode driver 15.

[3] Configuration of Display Panel 11

Next, the configuration of the display panel 11 will be described. In this embodiment, a semi-transmissive display panel will be discussed as an example. In the semi-transmissive display panel, a reflective area for displaying an image by reflecting the external light, and a transmissive area for displaying an image by allowing the backlight to pass through are included in one sub-pixel.

Figure 4:
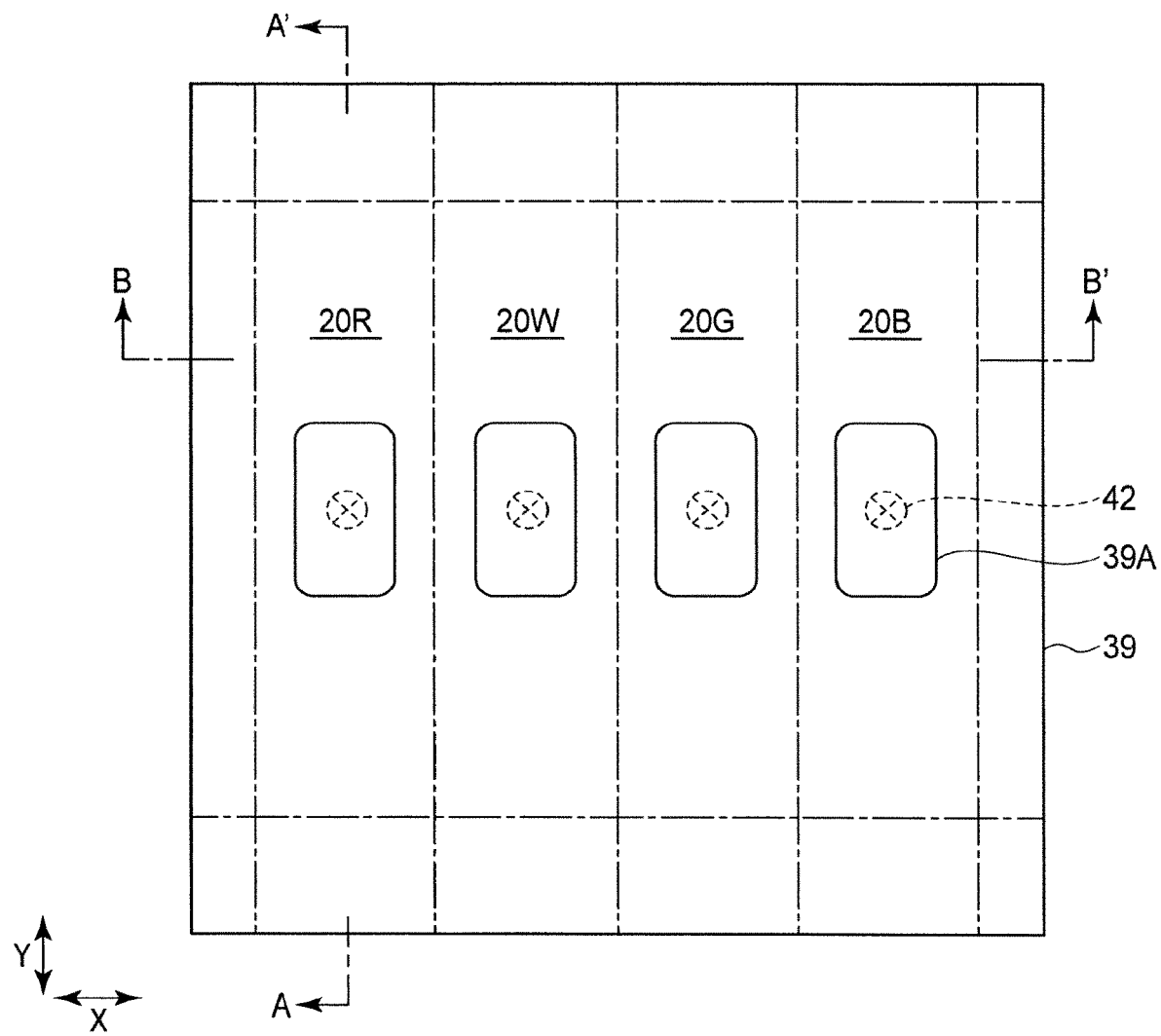
FIG. 4 is a plan view of the display panel according to the first embodiment.
Figure 5:
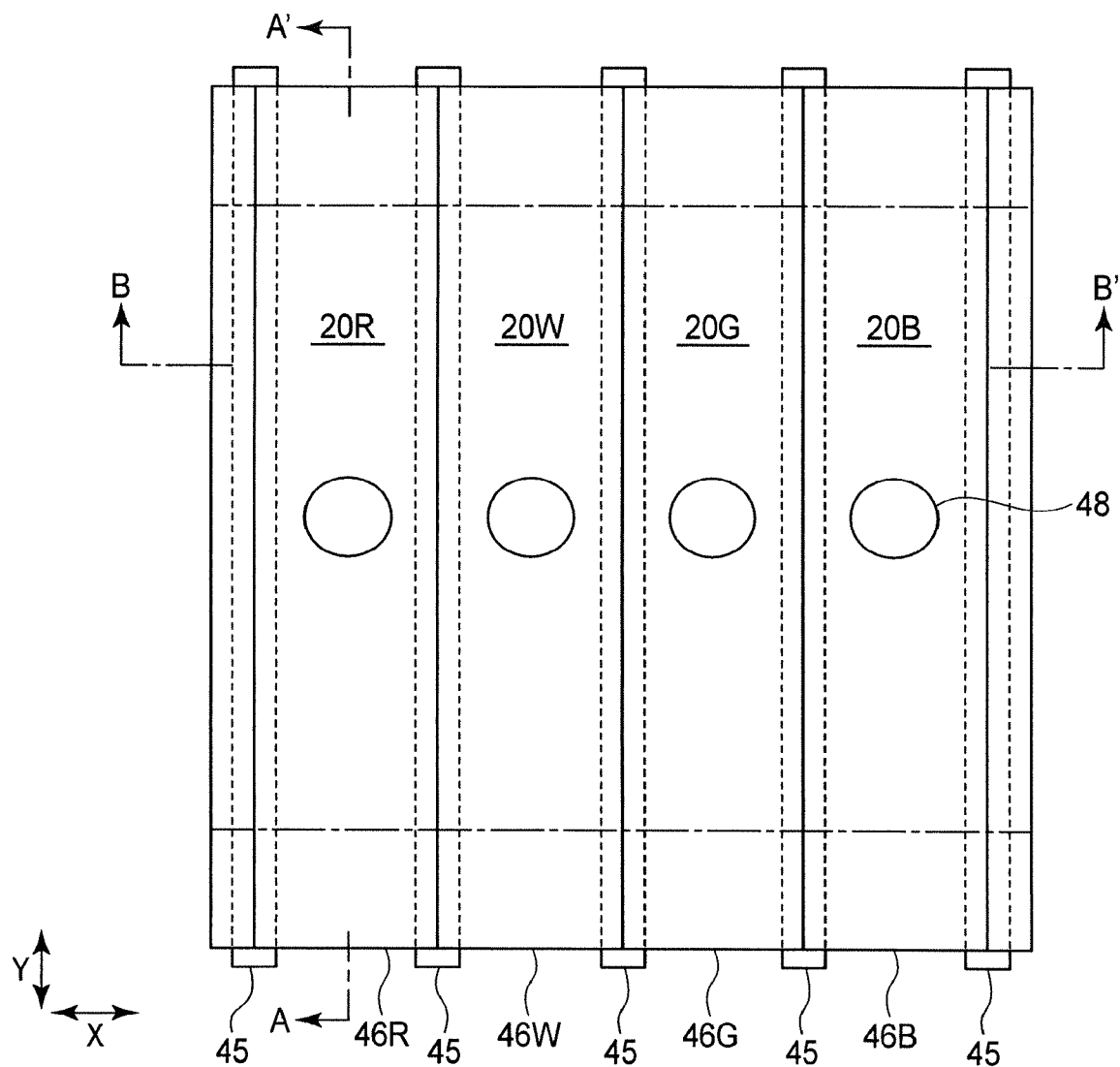
FIG. 5 is a plan view of the display panel according to the first embodiment.
Figure 6:
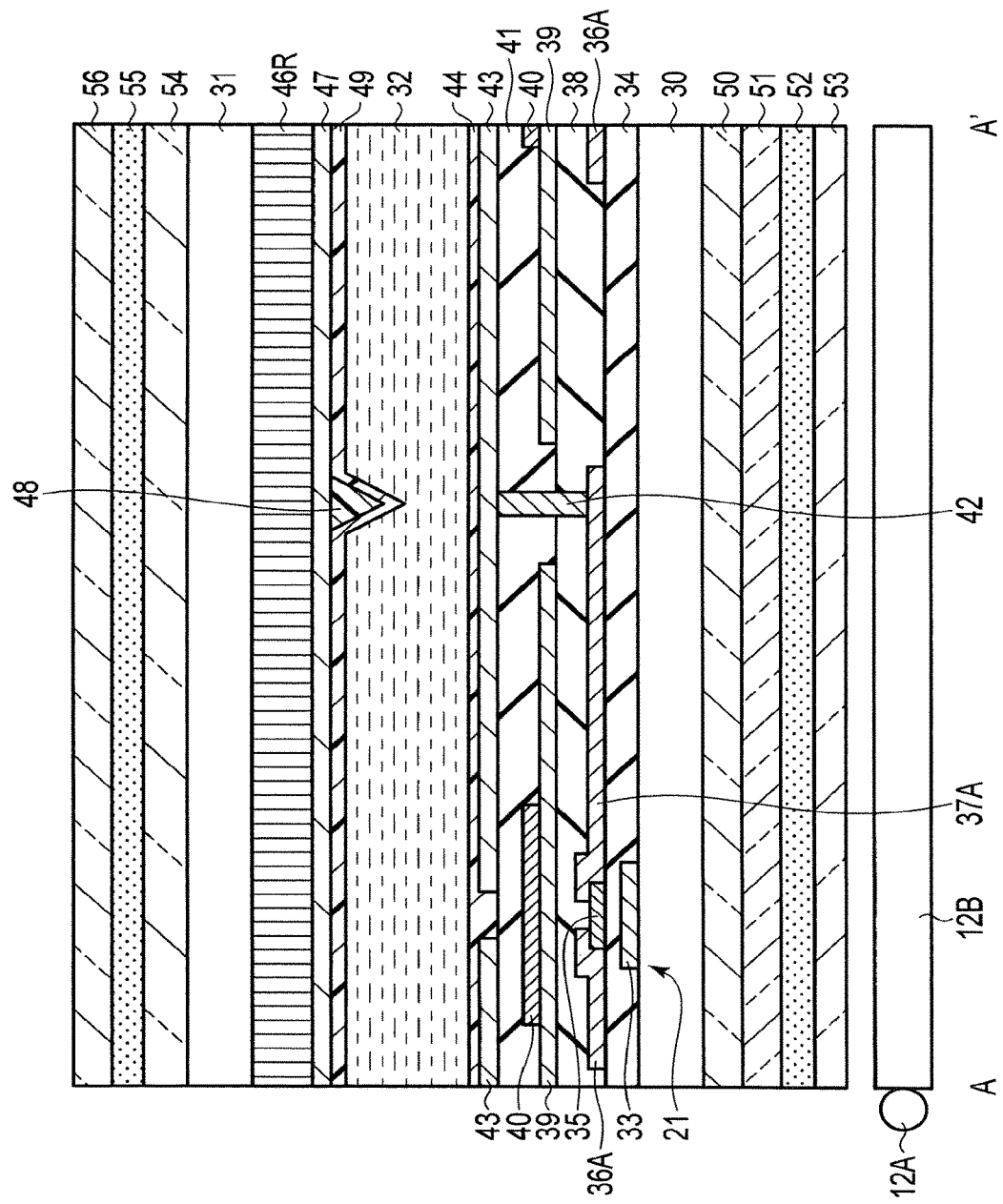
FIG. 6 is a cross-sectional view of the display panel taken along line A-A' in FIG. 3.
Figure 7:
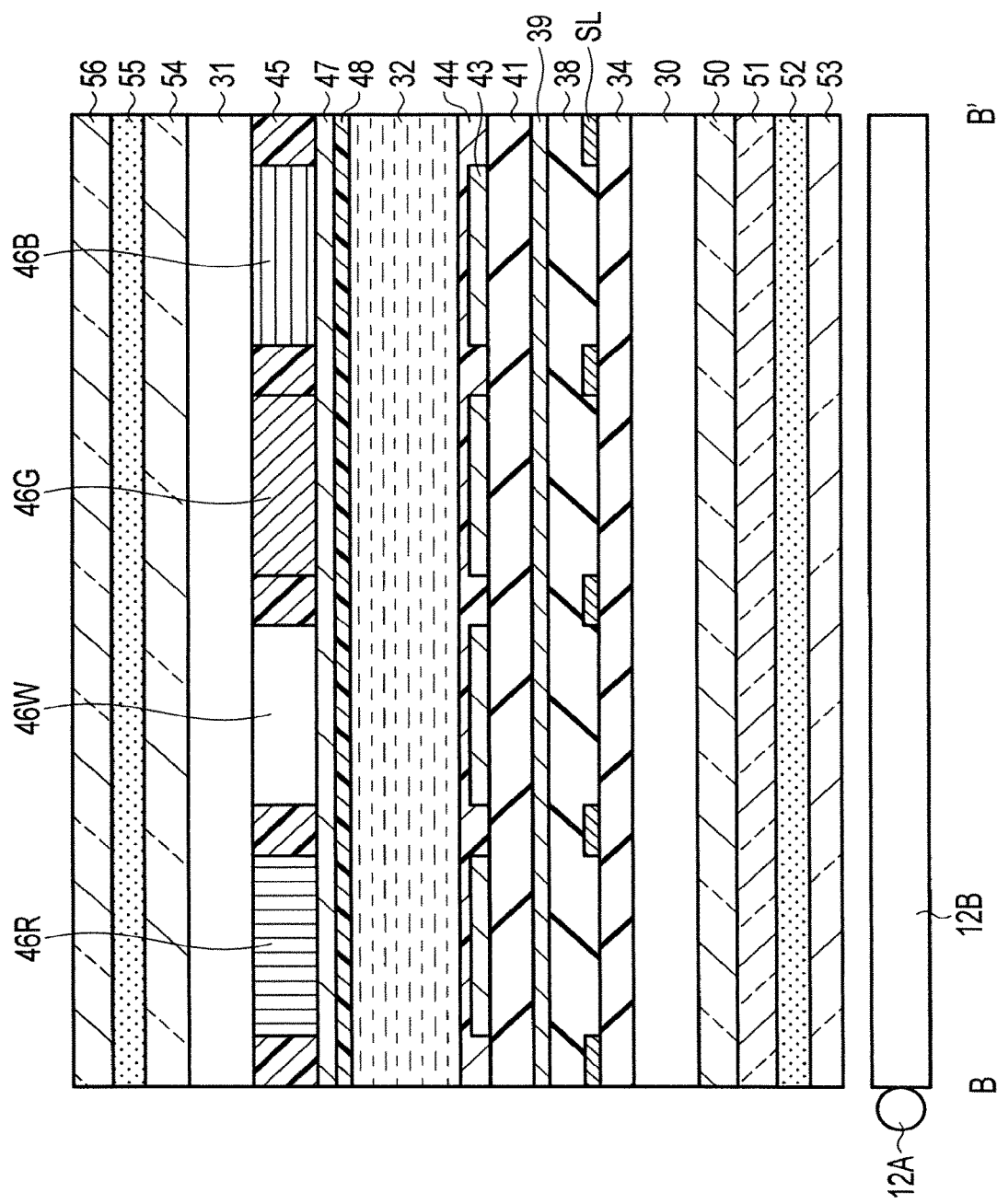
FIG. 7 is a cross-sectional view of the display panel taken along line B-B' in FIG. 3.

FIGS. 3 to 5 are plan views of the display panel 11 according to the first embodiment. FIG. 3 is a plan view mainly showing the configuration on the TFT substrate side, and FIG. 4 is a plan view of the storage electrode taken therefrom. FIG. 5 is a plan view mainly showing the configuration on the CF substrate side. FIG. 6 is a cross section of the display panel 11 taken along line A-A' in FIGS. 3 to 5, and FIG. 7 is a cross section of the display panel 11 taken along lines B-B' of FIGS. 3 to 5. In FIGS. 4 and 5, the auxiliary lines shown as dashed-dotted lines indicate the boundaries that separate the sub-pixels.

The backlight 12 includes a light-emitting element 12A and a light guide member 12B. The light-emitting element 12A is constituted by, for example, a white light-emitting diode (LED). The light guide member 12B irradiates the display panel 11 with the illumination light from the light-emitting element 12A as a surface light source. The light guide member 12B includes, for example, a reflective sheet, a light guide plate, and a diffusion sheet stacked in this order.

The light-emitting element 12A may be constituted by a high color rendering LED. The high color rendering LED emits white light that is closer to natural light (sunlight). Specifically, the spectrum (spectral distribution) of the high color rendering LED has a peak light intensity for each of blue, green, and red. The high color rendering LED may be constituted by combining a green phosphor and a red phosphor with a blue LED. The use of a high color rendering LED can improve the display characteristics of the liquid crystal display device 10.

The display panel 11 includes a TFT substrate 30 on which switching elements (TFT), pixel electrodes and the like are formed, and a color filter substrate (CF substrate) 31 on which color filters and the like are formed. The CF substrate 31 is arranged to face the TFT substrate 30. The TFT substrate 30 and the CF substrate 31 are both constituted by a transparent substrate (such as a glass substrate or a plastic substrate). The TFT substrate 30 is arranged to face the backlight 12 so that the illumination light from the backlight 12 is incident on the display panel 11 from the TFT substrate 30 side.

The liquid crystal layer 32 is interposed between the TFT substrate 30 and the CF substrate 31. Specifically, the liquid crystal layer 32 is sealed in a display region enclosed by the TFT substrate 30, the CF substrate 31, and a sealing material (not shown). The sealing material is made of, for example, an ultraviolet curable resin, a thermosetting resin, a UV-curable thermosetting resin, or the like. In the manufacturing process, after being applied to the TFT substrate 30 or the CF substrate 31, the sealing material is cured by ultraviolet irradiation, heating or the like.

In the liquid crystal material of the liquid crystal layer 32, the orientation of liquid crystal molecules is changed in accordance with the electric field applied between the TFT substrate 30 and the CF substrate 31, thereby changing the optical properties. The display panel 11 according to the present embodiment incorporates a vertical alignment (VA) type liquid crystal, and is of a VA mode. That is, a negative-type (N-type) nematic liquid crystal having negative dielectric anisotropy is adopted for the liquid crystal layer 32, and the liquid crystal molecules are aligned substantially perpendicular to the substrate surface when no voltage (no electric field) is applied. As the liquid crystal molecule alignment in the VA mode, the longitudinal axis (director) of the liquid crystal molecules is aligned vertically when no voltage is applied, whereas the director of the liquid crystal molecules is tilted into the horizontal direction when a voltage (electric field) is applied. The liquid crystal mode may be a homogeneous mode or twisted nematic (TN) mode. From the aspect of the improved contrast ratio (white/black (maximum luminance/minimum luminance)), however, the VA mode is preferred.

A plurality of TFTs 21 are provided on the liquid crystal layer 32 side of the TFT substrate 30 in a manner as to correspond to a plurality of sub-pixels 20. The TFT 21 includes, as described later, a gate electrode electrically connected to a scan line GL, a gate insulating film provided on the gate electrode, a semiconductor layer provided on the gate insulating film, and a source electrode and drain electrode provided apart from each other on the semiconductor layer. The source electrode is electrically connected to a signal line SL.

A plurality of gate electrodes 33 are provided on the TFT substrate 30 to extend in the X direction. A plurality of sub-pixels 20 aligned in one row in the X direction share one gate electrode 33. The gate electrode 33 functions as the scan line GL. A gate insulating film 34 is provided on the gate electrode 33 and the TFT substrate 30.

A plurality of semiconductor layers 35 are provided on the gate insulating film 34 in a manner as to correspond to the number of sub-pixels 20. As the semiconductor layer 35, an amorphous silicon layer may be adopted.

A source electrode 36A and a drain electrode 37A, which are spaced apart from each other in the Y direction, are provided on the semiconductor layer 35 and on the gate insulating film 34. Specifically, the source electrode 36A is formed to extend in the Y direction and to overlap part of the semiconductor layer 35. The drain electrode 37A is formed to extend in a direction opposite to the source electrode 36A and to overlap part of the semiconductor layer 35. As shown in FIG. 3, the source electrode 36A may be T-shaped in which its end portion that overlaps the semiconductor layer 35 has a greater width than its extension portion extending in the Y direction. Similarly, the drain electrode 37A may be inverted T-shaped, in which its end portion that overlaps the semiconductor layer 35 has a greater width than its extension portion extending in the Y direction.

A plurality of signal lines SL each extending in the Y direction are provided on the gate insulating film 34. A signal line SL is arranged at the boundary portion of the sub-pixels 20 that are adjacent in the X direction. A plurality of sub-pixels 20 arranged in one column in the Y direction are connected to one common signal line SL. The connection electrode 36B is provided on the gate insulating film 34 to extend in the X direction and to electrically connect the source electrode 36A to the signal line SL.

A connection electrode 37B is electrically connected to the end portion of the drain electrode 37A, and is provided on the gate insulating film 34 to extend in the Y direction. The end portion of the connection electrode 37B is provided with a large enough area so that the electrical connection with the pixel electrode 43 can be reliably compensated even when misalignment occurs during the manufacturing process. An insulating film 38 is provided on the source electrode 36A, the connection electrode 36B, the signal line SL, the drain electrode 37A, and the connection electrode 37B, and on the gate insulating film 34.

A storage electrode 39 is provided on the insulating film 38. In order to avoid complication of the plan view of FIG. 3, FIG. 4 focuses on a storage electrode 39 taken out of FIG. 3. The storage electrode 39 may take any shape as long as it partially overlaps the pixel electrode. As the area of the storage electrode 39 overlapping the pixel electrode increases, the storage capacity Cs increases. The same voltage as the common voltage applied to the common electrode, which will be described later, is applied to the storage electrode 39. The storage electrode 39 is provided with an opening 39A for each of the sub-pixels 20.

A plurality of reflective films 40 are provided on the storage electrode 39, each extending in the X direction. The reflective films 40 reflect light incident from the liquid crystal layer 32 side. The reflective film 40 is arranged so as to cover the TFT 21. In this manner, the TFT 21 is shielded by the reflective film 40 so that malfunction of the TFT 21 can be suppressed. The same voltage as the common voltage applied to the common electrode is applied to the reflective film 40.

The area of the sub-pixel 20 on which the reflective film 40 is provided serves as a reflective area RA, and the rest of the area serves as a transmissive area TA. In the example configuration of FIG. 3, the sub-pixel 20 includes a transmissive area TA in the center and two reflective areas RA1 and RA2 above and below the transmissive area TA. That is, the reflective area RA of the sub-pixel 20 is the total area of the reflective areas RA1 and RA2. In the present embodiment, the thickness (cell gap) of the liquid crystal layer 32 in the reflective area RA and the transmissive area TA is determined to be uniform (flat gap). Uniformity of the cell gap is maintained over all display areas by providing spacers 57, which will be described later.

According to the present embodiment, the area of the transmissive area TA is larger than the area of the reflective area RA. It is desirable that the area of the reflective area RA is 10% or more of the area of the transmissive area TA. If a higher priority is placed on the display in the transmissive area TA (transmissive display), the reflective film 40 should be formed to have the minimum area to cover the TFT 21. In this manner, the size of the transmissive area TA can be increased, which can improve the characteristics of the transmissive display. It is preferable to set the cell gap so as to optimize the transmissive display.

An insulating film 41 is provided on the reflective film 40, the storage electrode 39, and the insulating film 38. A pixel electrode 43 is provided on the insulating film 41 to extend in the Y direction. A sub-pixel 20 of the present embodiment corresponds approximately to the region of the pixel electrode 43. The pixel electrode 43 is electrically connected to the end of the connection electrode 37B via the contact plug 42. The contact plug 42 passes through the opening 39A provided in the storage electrode 39.

An alignment film 44 for controlling the orientation of the liquid crystal layer 32 is provided on the pixel electrode 43. The alignment film 44 is formed of a material that aligns the liquid crystal molecules of the liquid crystal layer 32 into a substantially vertical direction in an initial state (where no voltage is applied to the liquid crystal layer 32).

Next, the configuration of the CF substrate 31 side will be described. On the liquid crystal layer 32 side of the CF substrate 31, a black matrix (also referred to as a black mask or a light shielding film) 45 is provided for light shielding. The black matrix 45 is arranged at the boundary between two sub-pixels 20 that are adjacent to each other in the X direction. The black matrix 45 has a function of improving the contrast by shielding undesired light between color filters of different colors.

A plurality of color filters 46 are provided on the CF substrate 31 and the black matrix 45. The color filters (color members) 46 include a plurality of red filters 46R, a plurality of white filters 46W, a plurality of green filters 46G, and a plurality of blue filters 46B. The color filters of the present embodiment are formed by red (R), green (G), and blue (B), which are the three primary colors of light, and further incorporating white (W). The set of four adjacent colors of red, white, green, and blue constitutes a unit of display (pixel), and the monochromatic portion of one of red, white, green, and blue in a single pixel is referred to as a sub-pixel, which is the smallest drive unit. A TFT 21 and a pixel electrode 43 are provided for each sub-pixel. The sub-pixels capable of displaying red, white, green, and blue are denoted as 20R, 20W, 20G, and 20B, respectively.

The red filter 46R, white filter 46W, green filter 46G, and blue filter 46B are arranged at regular intervals along the X direction, and these sets are arranged in a matrix. According to the present embodiment, a stripe arrangement is illustrated as a pixel array, but other arrays may be adopted as a matter of course. The pixel array will be described later.

A common electrode 47 is provided on the color filters 46 and the black matrix 45. The common electrode 47 is formed in a planar shape so as to be common to all the pixels. The common voltage Vcom is applied to the common electrode 47 from the common electrode driver 15. An overcoat film (flattening film) made of a transparent insulating material may be provided on the color filters 46 and the black matrix 45 so as to improve the flatness.

A plurality of projections 48 are provided on the common electrode 47. The projections 48 are arranged in a manner as to individually correspond to the plurality of sub-pixels (that is, pixel electrodes 43). A projection 48 is arranged near the center of the corresponding sub-pixel (or pixel electrodes 43). The shape of the projection 48 may be a cone, a round-tipped column, a truncated cone, or a top-rounded truncated cone. The projection 48 is formed of a transparent resin. The projection 48 controls the orientation of the liquid crystal layer 32.

The liquid crystal display device 10 of the present embodiment adopts a multi-domain system. In the multi-domain system, one sub-pixel is divided into a plurality of regions (domains) so that the tilt direction of the liquid crystal molecules can be varied in the plurality of regions. The projections 48 formed on the common electrode 47 control the tilt direction of the liquid crystal molecules. That is, the liquid crystal molecules tilt radially around each projection 48. By adopting the multi-domain system, the dependence on the viewing angle can be significantly reduced, and the viewing angle can be increased.

An alignment film 49 is provided for controlling the orientation of the liquid crystal layer 32 on the common electrode 47 and the projections 48. The alignment film 49 is formed of a material that aligns the liquid crystal molecules of the liquid crystal layer 32 into a substantially vertical direction in an initial state (where no voltage is applied to the liquid crystal layer 32).

The thickness (cell gap) of the liquid crystal layer 32 is optimized by a plurality of spacers 57. The number of the spacers 57 and arrangement thereof can be determined as needed. Each spacer 57 is disposed between the insulating film 41 and the common electrode 47 so as to be in contact with them. The spacer 57 is shaped into a cylinder, and is made of a transparent resin.

On the opposite side of the TFT substrate 30 with respect to the liquid crystal layer 32, a retardation plate 50, a polarizer 51, a diffusion member 52, and a brightness enhancement film 53 are stacked in this order. On the opposite side of the CF substrate 31 with respect to the liquid crystal layer 32, a retardation plate 54, a diffusion member 55, and a polarizer 56 are stacked in this order. The retardation plate 50 and the polarizer 51 constitute a circular polarization plate, and the retardation plate 54 and the polarizer 56 constitute a circular polarization plate.

Each of the polarizers (linear polarizers) 51 and 56 has a transmission axis and absorption axis orthogonal to each other on a plane orthogonal to the traveling direction of light. Of the light having vibration planes in random directions, each of the polarizers 51 and 56 allows the passage of linearly polarized light (light component that is linearly polarized) having a vibration plane parallel to the transmission axis, while absorbing linearly polarized light (light component that is linearly polarized) having a vibration plane parallel to the absorption axis. The polarizers 51 and 56 are arranged in such a way that their transmission axes are orthogonal, or in other words, in a crossed Nicol state.

Each of the retardation plates 50 and 54 having refractive index anisotropy has a slow axis and fast axis orthogonal to each other on a plane orthogonal to the light traveling direction. Each of the retardation plates 50 and 54 have the function of providing a predetermined retardation between the light of predetermined wavelength that has passed through the slow axis and the light of predetermined wavelength that has passed through the fast axis (the retardation is a phase difference of $\lambda/4$ provided that the wavelength of the light is $\lambda$). That is, the retardation plates 50 and 54 are constituted by quarter-wave plates ($\lambda/4$ plates). The slow axis of the retardation plate 50 is determined to form an angle of approximately 45° with the transmission axis of the polarizer 51. The slow axis of the retardation plate 54 is determined to form an angle of approximately 45° with the transmission axis of the polarizer 56.

The above angles that define the polarizer and the retardation plate may include an error with which a desired operation can still be realized and an error caused by a manufacturing process. For example, the above-mentioned "approximately 45°" includes the range of 45°±5°. The above-mentioned "orthogonal" includes the range of 90°±5°.

The diffusion members 52 and 55 have a function of making the transmitted light uniform by diffusing (scattering) the transmitted light in random directions. The diffusion members 52 and 55 are constituted by a diffusion adhesive, diffusion films, diffusion plates or the like. If a diffusion adhesive is adopted for the diffusion members 52 and 55, the diffusion adhesive has a function of adhering the components on its two sides in addition to the function of diffusing the incident light. The stacking order of the diffusion member 55 and the retardation plate 54 may be reversed.

Specifically, the diffusion member 55 diffuses the reflection light reflected by the reflective film 40 so that the diffused reflection light can be observed by the observer. With the diffusion member 55, the reflectance and the viewing angle can be improved with regard to the reflective display in the reflective area RA.

The brightness enhancement film 53 has the function of improving the utilization efficiency of the light from the backlight 12 and improving the brightness of the liquid crystal display device 10. The brightness enhancement film 53 is constituted by a reflective polarization film, a prism sheet, or the like. The brightness enhancement film 53 reflects the light that is supposed to be absorbed by the polarizer 51 (light parallel to the absorption axis of the polarizer 51) toward the backlight 12 side. The light reflected by the brightness enhancement film 53 toward the backlight 12 side is reflected by the backlight 12 and reused.

(Examples of Material)

Aluminum (Al), molybdenum (Mo), chromium (Cr), or tungsten (W), or an alloy containing at least one of these elements, may be adopted for the gate electrode 33, source electrode 36A, connection electrode 36B, signal line SL, drain electrode 37A, and connection electrode 37B. For example, aluminum (Al) may be adopted for the reflective film 40. The storage electrode 39, contact plug 42, pixel electrode 43, and common electrode 47 are formed of transparent electrodes, for which, for example, indium tin oxide (ITO) may be adopted. The gate insulating film 34, insulating film 38, and insulating film 41 are formed of a transparent insulating material, for which, for example, silicon nitride (SiN) may be adopted.

(Pixel Array)

According to the present embodiment, one display element (pixel) 22 includes a sub-pixel 20R displaying red (R), a sub-pixel 20W displaying white (W), a sub-pixel 20G displaying green (G), and a sub-pixel 20B displaying blue (B). The sub-pixel 20R, sub-pixel 20W, sub-pixel 20G, and sub-pixel 20B realize color display by the red filter 46R, white filter 46W, green filter 46G, and blue filter 46B, respectively.

FIGS. 8 to 11 are schematic diagrams showing an example array of pixels 22. A solid-lined box is drawn around each pixel 22 in FIGS. 8 to 11.

FIG. 8 is a stripe arrangement. The sub-pixels 20R, sub-pixels 20W, sub-pixels 20G, and sub-pixels 20B are arranged at regular intervals in the X direction. One column includes sub-pixels of the same color. That is, a sub-pixel 20R, sub-pixel 20W, sub-pixel 20G, and sub-pixel 20B are arranged in a vertical striped pattern. One pixel 22 including the sub-pixel 20R, the sub-pixel 20W, the sub-pixel 20G, and the sub-pixel 20B is shaped substantially into a square.

Figure 9:
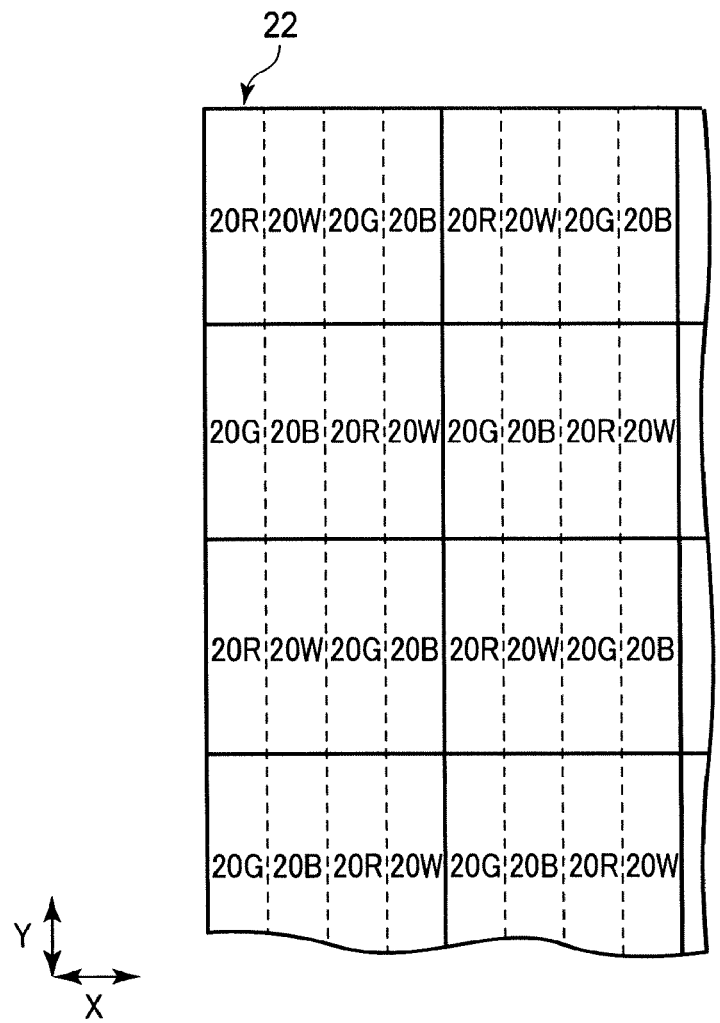
FIG. 9 is a schematic diagram of another example pixel array.

In the example array shown in FIG. 9, the odd-numbered row and the even-numbered row have different arrangements of the sub-pixels. For example, in the odd-numbered rows, a sub-pixel 20R, sub-pixel 20W, sub-pixel 20G, and sub-pixel 20B are arranged in this order, while in the even-numbered rows, a sub-pixel 20G, sub-pixel 20B, sub-pixel 20R, and sub-pixel 20W are arranged in this order. One pixel 22 including a sub-pixel 20R, sub-pixel 20W, sub-pixel 20G, and sub-pixel 20B is shaped substantially into a square.

Figure 10:
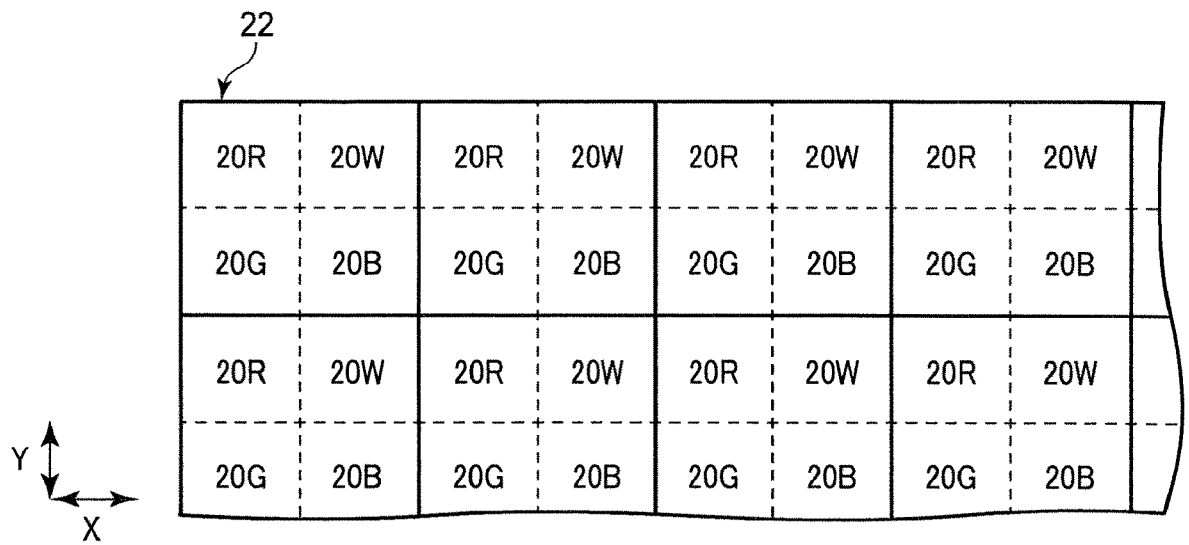
FIG. 10 is a schematic diagram of another example pixel array.

In the example arrangement shown in FIG. 10, a sub-pixel 20R, sub-pixel 20W, sub-pixel 20G, and sub-pixel 20B are arranged into a two-row and two-column pattern. Furthermore, the two-row and two-column pixels 22 are arranged into a matrix. One pixel 22 including a sub-pixel 20R, sub-pixel 20W, sub-pixel 20G, and sub-pixel 20B is shaped substantially into a square.

Figure 11:
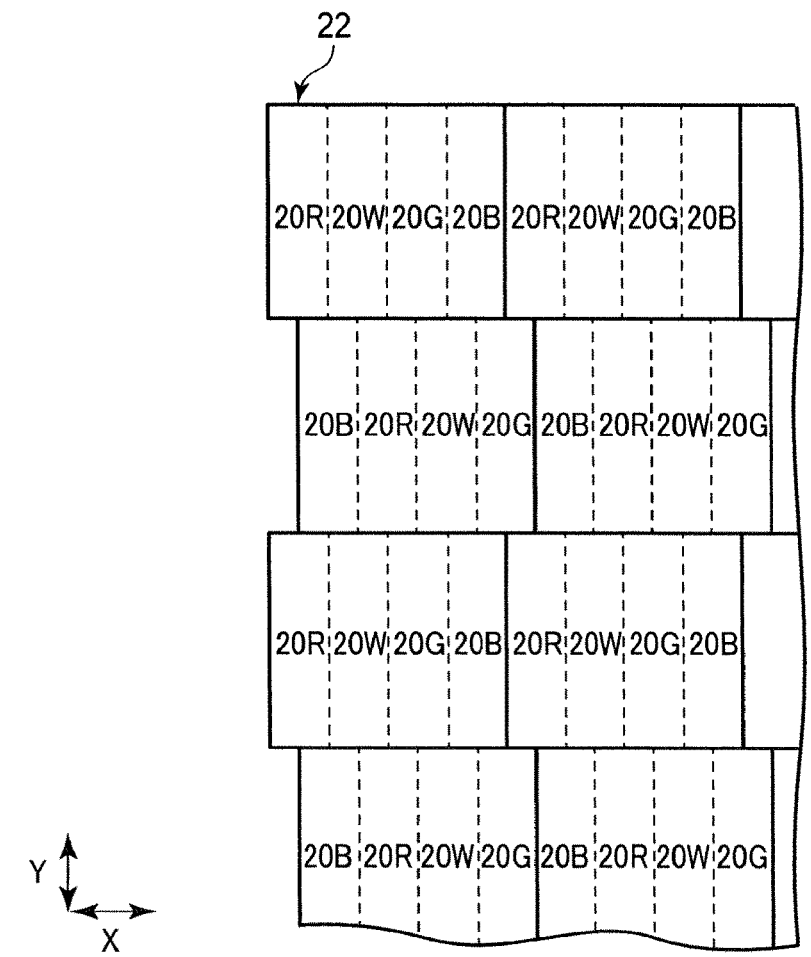
FIG. 11 is a schematic diagram of another example pixel array.

In the example array shown in FIG. 11, the odd-numbered row and the even-numbered row have different arrangements of the sub-pixels. For example, in the odd-numbered rows, a sub-pixel 20R, sub-pixel 20W, sub-pixel 20G, and sub-pixel 20B are arranged in this order, while in the even-numbered rows, a sub-pixel 20B, sub-pixel 20R, sub-pixel 20W, and sub-pixel 20G are arranged in this order. Furthermore, the odd rows and the even rows are offset by ½ pitch from each other. One pixel 22 including a sub-pixel 20R, sub-pixel 20W, sub-pixel 20G, and sub-pixel 20B is shaped substantially into a square.

The example arrays of the color filters are not limited to the arrays of FIGS. 8 to 11. The configuration is sufficient as long as one display element is constituted by color filters of four colors that are adjacent in the row direction and/or the column direction. The arrangement of a sub-pixel 20R, sub-pixel 20W, sub-pixel 20G, and sub-pixel 20B can be freely determined.

[4] Operation

Next, the operation of the liquid crystal display device 10 configured as described above will be described. The liquid crystal display device 10 according to the present embodiment receives from an external device the gradation data of three colors, red (R), green (G), and blue (B), for individual pixels. Then, the liquid crystal display device 10 converts the three-color gradation data into the gradation data of four colors, red (R), green (G), blue (B), and white (W), and thereafter displays the video image using the four-color gradation data. The three colors of red (R), green (G), and blue (B) may be denoted as "RGB", and four colors of red (R), green (G), blue (B) and white (W) may be denoted as "RGBW". Hereinafter, the operation of the liquid crystal display device 10 will be described separately for the first example and for the second example.

[4-1] First Example

The control unit 19 receives a video signal DAT from an external device. The video signal DAT includes three-color (RGB) gradation data (tone values) $d_R$, $d_G$, and $d_B$ for red (R), green (G), and blue (B) for each pixel. The data converting unit 19A converts the three-color gradation data $d_R$, $d_G$, and $d_B$ into four-color (RGBW) gradation data $D_R$, $D_G$, $D_B$, and $D_W$ of red (R), green (G), blue (B), and white (W). Any of the three-color gradation data $d_R$, $d_G$ and $d_B$ and any of the four-color gradation data $D_R$, $D_G$, $D_B$, and $D_W$ is an integer of 0 or greater.

The conversion from the three-color gradation data (input signals) $d_R$, $d_G$, and $d_B$ to the four-color gradation data (conversion signals) $D_R$, $D_G$, $D_B$ and $D_W$ is performed by the data conversion unit 19A, as represented by the following expressions.

$$D_R = d_R$$

$$D_G = d_G$$

$$D_B = d_B$$

$$D_W = [d_R \cdot d_G \cdot d_B / (Z-1)^2]$$

"Z" denotes the number of gradation levels (the number of gradation levels is equal to the maximum gradation level). The parentheses "[ ]" represent an integer (integerized value), or in other words an integerizing operation. In the integerizing operation, a figure including decimal digits is rounded down to the nearest integer, that is, calculation of the maximum integer that does not exceed the figure in parentheses is performed (for example, [1.2]=1). In the integerizing operation, a figure including decimal digits may be rounded off to the nearest integer, or may be rounded up to the nearest integer. The data conversion expressions and programs are stored in the memory unit 18 in a nonvolatile manner.

For example, in the case of 64 gradation levels (Z=64), the four-color gradation data $D_R$, $D_G$, $D_B$, and $D_W$ are obtained as shown in FIG. 12. For example, "$(d_R, d_G, d_B)→(D_R, D_G, D_B, D_W)$" may be "(0, 0, 0)→(0, 0, 0, 0)", "(63, 0, 0)→(63, 0, 0, 0)", "(63, 63, 0)→(63, 63, 0, 0)", "(63, 63, 63)→(63, 63, 63, 63)".

In the following description, the display color is the color displayed by the pixel 22 including the sub-pixels 20R, 20W, 20G, and 20B. When the pixel 22 is to display one of the three primary colors of light consisting of red (R), green (G), and blue (B) at the maximum gradation level, the control unit 19 sets the white gradation level to zero. The control unit 19 also sets the white gradation level to zero if the pixel 22 is to display one of the three primary colors of the color model, which are cyan (C), magenta (M), and yellow (Y), at the maximum gradation level. The maximum gradation level of red is "$(D_R, D_G, D_B, D_W)=(63, 0, 0, 0)$". The maximum gradation level of green is "$(D_R, D_G, D_B, D_W)=(0, 63, 0, 0)$". The maximum gradation level of blue is "$(D_R, D_G, D_B, D_W)=(0, 0, 63, 0)$". The maximum gradation level of cyan is "$(D_R, D_G, D_B, D_W)=(0, 63, 63, 0)$". The maximum gradation level of magenta is "$(D_R, D_G, D_B, D_W)=(63, 0, 63, 0)$". The maximum gradation level of yellow is "$(D_R, D_G, D_B, D_W)=(63, 63, 0, 0)$". In other words, the control unit 19 sets the white gradation level to zero when at least one of the three-color gradation data (input signals) $d_R$, $d_G$, and $d_B$ is zero in a pixel 22.

The control unit 19 increases the intensity of white in a pixel 22, as the color purity of each of the three primary colors of light consisting of red (R), green (G), and blue (B) is lowered. The control unit 19 increases the intensity of white in the pixel 22, as the color purity of each of the three primary colors of the color model, cyan (C), magenta (M), and yellow (Y), is lowered. In other words, when the color purity of each of the primary colors (including red, green, blue, cyan, magenta, and yellow) takes the largest value (maximum gradation level) in the pixel 22, $D_W=0$. Otherwise, the intensity of white is added. In the xy chromaticity diagram, of the triangle created by linearly connecting the chromaticity coordinates of the three primary colors of light that are red (R), green (G), and blue (B), the gradation level of white is low in the peripheral portion representing the primary colors (red, green, blue, cyan, magenta, and yellow), and the gradation level of white increases as the coordinates become closer to the white point (white coordinates).

In the display of white, all of RGBW are at the maximum gradation level, "$(D_R, D_G, D_B, D_W)=(63, 63, 63, 63)$".

With such display control, the intensity of white can be increased while improving the color reproducibility of primary colors.

FIG. 13 is a diagram that explains example specifications of the liquid crystal display device 10 according to the first embodiment. The configuration (CF configuration) of the color filters, the ratio of the reflective area to the transmissive area, the color specification (CF color specification) of the color filters, and the liquid crystal layer thickness (cell gap) are indicated in FIG. 13. Comparative Example 1 shows a liquid crystal display incorporating color filters of three colors RGB, whereas the first embodiment shows a liquid crystal display incorporating color filters of four colors RGBW. "A" in the ratio of the reflective area to the transmissive area represents the area of the reflective area in a sub-pixel. Specifically, the area of the reflective film formed in the transistor area (the region occupied by the TFT) is represented. The transmissive area "B" is the area obtained by subtracting the transistor area "A" from the sub-pixel. In FIG. 13, the area occupied by the transmissive area B in the sub-pixel is maximized. For the color specification of the color filter, the color reproducibility of the color filter is represented by the National Television Standards Committee (NTSC) ratio. The thickness of the liquid crystal layer is, for example, 3.8 μm, which is a value that places a higher priority on the transmissive display.

FIG. 14 is a diagram that explains the properties of the liquid crystal display device 10 according to the first embodiment. The properties of FIG. 14 correspond to a liquid crystal display having the specifications of FIG. 13. In FIG. 14, the reflectance, transmittance, and color reproducibility (NTSC ratio) are indicated. For each of the reflectance and the transmittance, the relative ratio of the first embodiment is indicated when "1.0" is set for Comparative Example 1. The color reproducibility (NTSC ratio) shows the properties in the transmissive area.

As can be understood from FIG. 14, the liquid crystal display device 10 according to the first embodiment enables an approximately 1.3-fold increase in both the reflectance and the transmittance in comparison to Comparative Example 1. In other words, if the reflectance and the transmittance of Comparative Example 1 are realized in accordance with the first embodiment, the color purity of the color filters can be increased in accordance with the increase in the reflectance and the transmittance, as a result of which the color reproducibility of the display panel can be increased. Furthermore, the brightness of the backlight may be lowered, which can also reduce the power consumption.

[4-2] Second Example

In the second example, the brightness of the video image is adjusted in accordance with the ambient illuminance of the liquid crystal display device 10. That is, display characteristics are improved when viewing the screen indoors and also when viewing the screen outdoors.

The illuminance sensor 17 measures the ambient illuminance of the liquid crystal display device 10. The parameter setting unit 19B receives the illuminance data from the illuminance sensor 17. The parameter setting unit 19B uses the illuminance data to set the parameter α. When the illuminance is low (which can be assumed as being indoors), the parameter setting unit 19B reduces the parameter α to place higher priority on the color purity, while increases the parameter α when the illuminance is high (which can be assumed as being outdoors) to place higher priority on the brightness of the screen.

The data converting unit 19A converts the gradation data $d_R$, $d_G$, and $d_B$ of three colors RGB into gradation data $D_R$, $D_G$, $D_B$, and $D_W$ of four colors of RGBW. The conversion from the three-color gradation data (input signals) $d_R$, $d_G$, and $d_B$ to the four-color gradation data (conversion signals) $D_R$, $D_G$, $D_B$ and $D_W$ is performed by the data conversion unit 19A, as represented by the following expressions.

$$D_R = d_R$$

$$D_G = d_G$$

$$D_B = d_B$$

$$D_W = [-\alpha X^2 + \{1+\alpha(Z-1)\}X]$$

$$X = d_R \cdot d_G \cdot d_B / (Z-1)^2$$

The parameter α satisfies the relationship of "$0 \leq \alpha \leq \{1/(Z-1)^2\}$".

For 64 gradations (Z=64) and the parameter α=0.0048 (assumed as indoors), the four-color gradation data $D_R$, $D_G$, $D_B$, and $D_W$ are calculated as shown in FIG. 15. For example, "$(d_R, d_G, d_B) \rightarrow (D_R, D_G, D_B, D_W)$" becomes "(43, 56, 43)→(43, 56, 43, 30)" and "(23, 3, 60)→(23, 3, 60, 1)".

For 64 gradations (Z=64) and the parameter α=0.0159 (assumed as outdoors), the four-color gradation data $D_R$, $D_G$, $D_B$, and $D_W$ are obtained as shown in FIG. 16. For example, "$(d_R, d_G, d_B) \rightarrow (D_R, D_G, D_B, D_W)$" becomes "(43, 56, 43)→(43, 56, 43, 41)" and "(23, 3, 60)→(23, 3, 60, 2)".

According to the second embodiment, the white gradation data $D_W$ can be adjusted in accordance with the illuminance (parameter α) of the ambient environment of the liquid crystal display device 10. Specifically, when the ambient environment is dark, white constraints are intensified by reducing the gradation data $D_W$. When the ambient environment is bright, the white constraints are lessened by increasing the gradation data $D_W$. When the ambient environment is bright, the screen looks dark, and therefore the screen can be brightened by increasing the brightness of white.

In a manner similar to the first embodiment, if the pixel 22 is to display one of the three primary colors of light consisting of red (R), green (G), and blue (B) at the maximum gradation level, the control unit 19 sets the white gradation level to zero. The control unit 19 further sets the white gradation level to zero if the pixel 22 is to display one of the three primary colors of the color model consisting of cyan (C), magenta (M), and yellow (Y), at the maximum gradation level.

The control unit 19 increases the intensity of white in the pixel 22, as the color purity decreases in each of the three primary colors of light, red (R), green (G), and blue (B). The control unit 19 increases the intensity of white in the pixel 22, as the color purity decreases in each of the three primary colors of the color model, cyan (C), magenta (M), and yellow (Y). In the display of white, all of RGBW are at the maximum gradation level, that is, "$(D_R, D_G, D_B, D_W) = (63, 63, 63, 63)$".

With such a display control, the intensity of white can be increased, while improving the color reproducibility of the primary colors.

[5] Effect of First Embodiment

As described in detail above, the liquid crystal display device 10 includes pixels 22 each including four sub-pixels 20R, 20G, 20B, and 20W that can display red, green, blue, and white, respectively, in the first embodiment. Each of the sub-pixels 20R, 20G, 20B and 20W has a reflective area RA and a transmissive area TA, and the thickness of the liquid crystal layer 32 in the reflective area RA is the same as the thickness of the liquid crystal layer 32 in the transmissive area TA. In the reflective area RA of the TFT substrate 30, a reflective film 40 is provided in a manner as to cover the switching element 21. A pixel electrode 43 is provided in the reflective area RA and the transmissive area TA above the reflective film 40, with an insulating film 41 interposed in-between. A red filter 46R, green filter 46G, blue filter 46B, and white filter 46W are provided on the CF substrate 31 in a such manner as to correspond to the sub-pixels 20R, 20G, 20B, and 20W, respectively. On the opposite side of the TFT substrate 30 with respect to the liquid crystal layer 32, a first laminated member including a retardation plate 50 and a polarizer 51 is provided. On the opposite side of the CF substrate 31 with respect to the liquid crystal layer 32, a second laminated member including a retardation plate 54, a diffusion member 55 for diffusing light, and a polarizer 56 is provided.

In this manner, the display characteristics can be improved according to the first embodiment, while realizing both reflective display and transmissive display. Furthermore, the display is performed in four colors, adopting a white filter in addition to the three colors of the red filter, green filter, and blue filter. Thus, in comparison to the three-color display, bright display can be realized. Moreover, the reflectance and the transmittance can be improved without lowering the color purity.

In addition, the control unit 19 receives the three-color gradation data $d_R$, $d_G$, and $d_B$ of red, green, and blue for each pixel from the external device, and converts the three-color gradation data into four-color gradation data $D_R$, $D_G$, $D_B$, and $D_W$ of red, green, and blue, and white. In this manner, the image display using four colors can be realized without changing the specifications of the external device.

Furthermore, the illuminance of the ambient environment is measured by the illuminance sensor 17 so that the measured illuminance data can be used to adjust the gradation level of the sub-pixel 20W displaying white. In this manner, even when the liquid crystal display device 10 is used both outdoors and indoors, the display characteristics of the liquid crystal display device 10 can be improved.

Furthermore, the optimal reflective display and transmissive display can be realized without changing the cell gap (flat gap) between the reflective area and transmissive area. Because an alignment defect that used to occur at the boundary between the reflective area and transmissive area in the conventional art (multi-gap structure) does not occur, shielding against light leakage is not required. As a result, the aperture ratio can be prevented from being lowered. In addition, since no transparent step film or the like that changes the cell gaps between the reflective area and transmissive area is required, the number of process steps can be reduced, realizing the cost reduction.

In addition, the structure of the present embodiment is highly effective specifically for high-definition panels that exceed 300 ppi, and therefore the application of a semi-transmissive type can be realized for a high-definition panel.

Moreover, by arranging the retardation plates 50 and 54 formed of λ/4 plates, the optical design of the reflective display can be optimized. In the transmissive display, the light in the area of the liquid crystal molecules tilted in the axial direction of the polarizer, which used to be non-extractable by the linear polarizer, can be extracted. This can enhance the transmittance of the transmissive area.

Furthermore, a diffusion member 55 is provided on the CF substrate 31 side. The diffusion member 55 diffuses the reflection light reflected by the reflective film 40 so that the diffused reflection light can be observed by the observer. With the diffusion member 55, the reflectance and the viewing angle can be improved with regard to the reflective display in the reflective area.

Second Embodiment

The second embodiment is an example configuration of a liquid crystal display in which the display characteristics in the reflective area are improved. The display characteristics can be further improved when the liquid crystal display is used outdoors.

Figure 18:
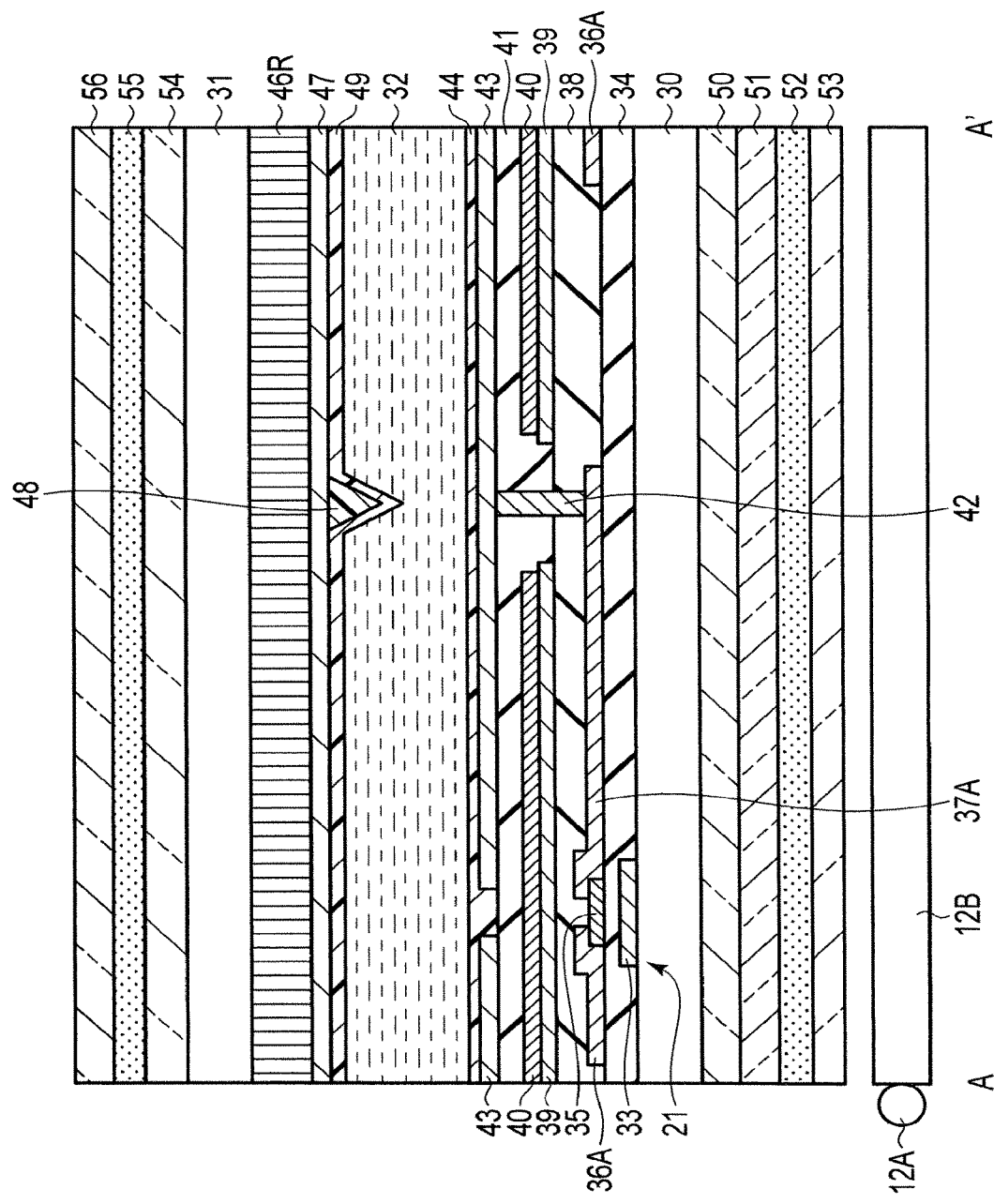
FIG. 18 is a cross-sectional view of the display panel taken along line A-A' in FIG. 17.
Figure 19:
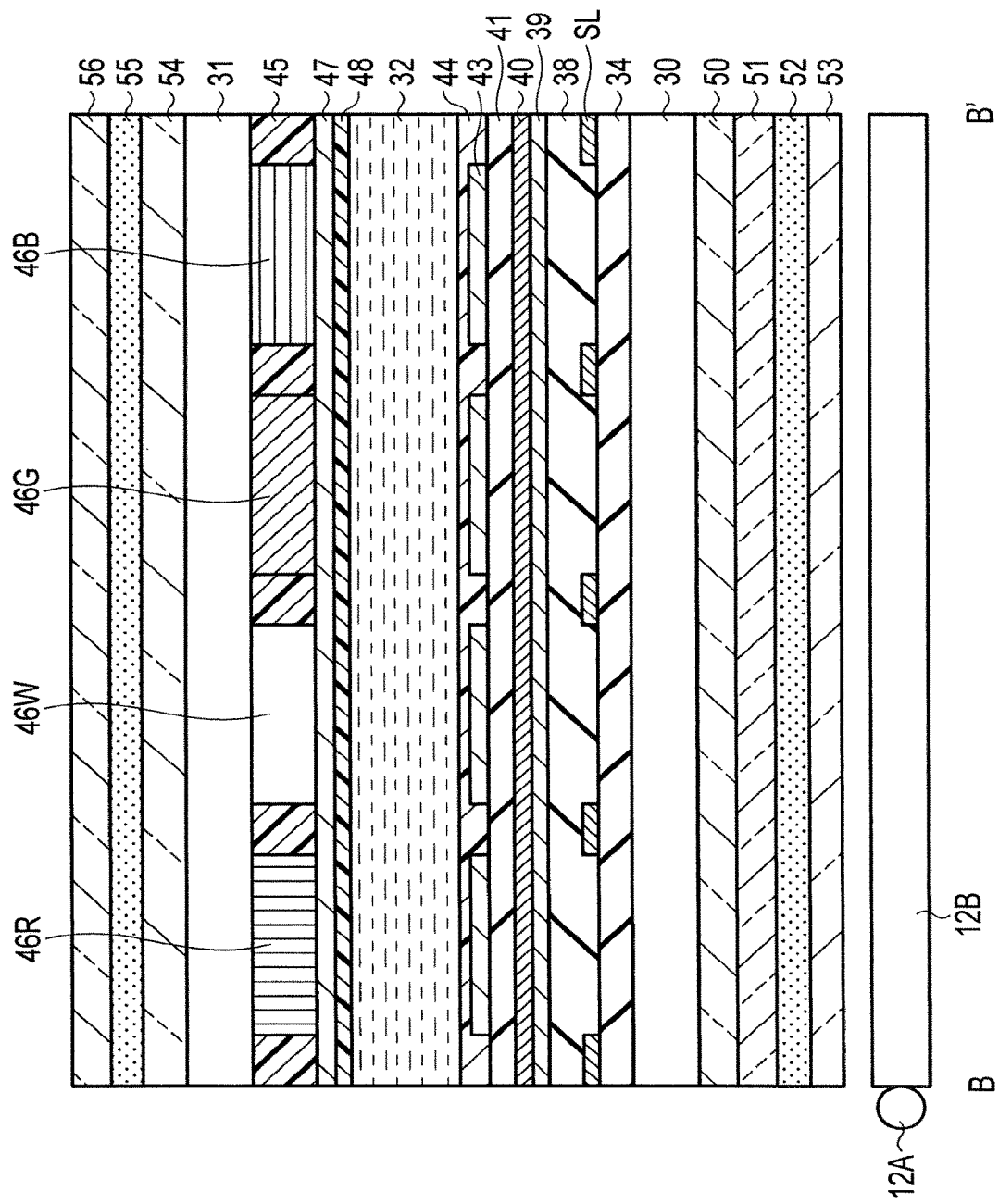
FIG. 19 is a cross-sectional view of the display panel taken along line B-B' in FIG. 17.

FIG. 17 is a plan view of the display panel 11 according to the second embodiment of the present invention. FIG. 18 is a cross section of the display panel 11 taken along line A-A' of FIG. 17. FIG. 19 is a cross section of the display panel 11 taken along line B-B' of FIG. 17. FIG. 4 (plan view focusing on the storage electrode) and FIG. 5 (plan view mainly showing the configuration of the CF substrate side) explained in the first embodiment are applicable to the second embodiment also.

A plurality of reflective films 40 are provided on the storage electrode 39 to each extend in the X direction. A reflective film 40 in the second embodiment has a larger area than in the first embodiment. The reflective film 40 forms the reflective area RA of a sub-pixel 20. Except for the configuration of the reflective films 40, the structure is the same as the first embodiment.

A sub-pixel 20 has a central transmissive area TA and two reflective areas RA1 and RA2 provided above and below the transmissive area TA. That is, the reflective area RA of the sub-pixel 20 is constituted by the reflective areas RA1 and RA2. In the second embodiment, the reflective area RA has a larger area than the area of the transmissive area TA, and therefore the display characteristics using reflection can be improved. That is, the second embodiment is an example configuration placing higher priority on the display in the reflective area RA. The second embodiment is an outdoor-oriented liquid crystal display, which is to be used mainly outdoors. The cell gap is preferably determined so as to optimize the reflective display. The cell gap in the second embodiment is set smaller than the cell gap in the first embodiment.

FIG. 20 is a diagram for explaining example specifications of the liquid crystal display device 10 according to the second embodiment. Comparative Example 2 is a liquid crystal display incorporating color filters for three colors of RGB, and the second embodiment is a liquid crystal display incorporating color filters for four colors of RGBW. The color specification of a color filter is, for example, NTSC ratio 20%. The thickness of the liquid crystal layer is, for example, 2.0 μm, which is a reflective display-oriented value.

The ratio between the reflective area and transmissive area is set to "(A+0.75B):0.25B". As in the first embodiment, "A" denotes the area of the transistor area (the area occupied by the TFT), and "B" denotes the size of the transmissive area obtained by subtracting the transistor area "A" from the sub-pixel. In the second embodiment, ¾ of the transmissive area of the first embodiment is further assigned to the reflective area.

FIG. 21 is a diagram for explaining the properties of the liquid crystal display device 10 according to the second embodiment. The properties of FIG. 21 correspond to the liquid crystal display to which the specifications of FIG. 20 are applied. The reflectance and the transmittance represent the relative values of the second embodiment when "Comparative Example 2" is "1.0". The color reproducibility (NTSC ratio) shows the properties in the transmissive area.

As can be seen from FIG. 21, the liquid crystal display device 10 according to the second embodiment can improve the reflectance and the transmittance by about 1.3 times in comparison to Comparative Example 2. In other words, if the reflectance and transmittance of Comparative Example 2 are realized in the second embodiment, the color purity of the color filters can be improved by an increase in the reflectance and transmittance, as a result of which the color reproducibility of the display panel can be increased. The brightness of the backlight may be lowered, which can reduce the power consumption.

As described above in detail, according to the second embodiment, the display characteristics using reflection can be further improved while realizing a semi-transmissive liquid crystal display. For other aspects, the same effects as in the first embodiment can be produced.

Although the above embodiments individually show a configuration example of a semi-transmissive liquid crystal display, the embodiments are also applicable to a transmissive liquid crystal display that does not incorporate a reflective film.

The present invention is not limited to the above-mentioned embodiments, and can be reduced to practice by modifying the constituent elements without departing from the spirit and scope of the invention. In addition, the above-described embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are deleted, the structure made up of the resultant structural elements can be extracted as an invention.

The invention claimed is:

1. A liquid crystal display, comprising:
   first and second substrates;
   a liquid crystal layer interposed between the first and second substrates;
   a pixel comprising first to fourth sub-pixels capable of respectively displaying red, green, blue, and white, each sub-pixel of the first to fourth sub-pixels comprising a reflective area and a transmissive area arranged in an adjacent area to the reflective area in a horizontal direction;
   a switching element provided on the first substrate to correspond to each sub-pixel;
   a reflective film provided in the reflective area above the switching element with an insulating film interposed in-between;
   a pixel electrode provided in the reflective area and the transmissive area above the reflective film with an insulating film interposed in-between;
   a red filter, a green filter, a blue filter, and a white filter provided on the second substrate to correspond to the first to fourth sub-pixels, respectively;
   a first laminated member provided on an opposite side of the first substrate with respect to the liquid crystal layer, the first laminated member comprising a first retardation plate and a first polarizer; and
   a second laminated member provided on an opposite side of the second substrate with respect to the liquid crystal layer, the second laminated member comprising a second retardation plate, a diffusion member for diffusing light, and a second polarizer.

2. The liquid crystal display according to claim 1, further comprising a control unit configured to receive three-color gradation data $d_R$, $d_G$, and $d_B$ of red, green, and blue, convert the three-color gradation data to four-color gradation data $D_R$, $D_G$, $D_B$, and $D_W$ of red, green, blue, and white, and drive the first to fourth sub-pixels using the four-color gradation data, wherein the control unit executes operations of:

$$D_R=d_R$$

$$D_G=d_G$$

$$D_B=d_B$$

$$D_W=d_R \cdot d_G \cdot d_B/(Z-1)^2$$

where Z is a maximum gradation level.

3. The liquid crystal display according to claim 1, further comprising a control unit configured to receive three-color gradation data $d_R$, $d_G$, and $d_B$ of red, green, and blue, convert the three-color gradation data into four-color gradation data $D_R$, $D_G$, $D_B$, and $D_W$ of red, green, blue, and white, and drive the first to fourth sub-pixels using the four-color gradation data,
   wherein the control unit executes operations of:

$$D_R=d_R$$

$$D_G=d_G$$

$$D_B=d_B$$

$$D_W=-\alpha X^2+\{1+a(Z-1)\}X$$

$$X=d_R \cdot d_G \cdot d_B/(Z-1)^2$$

$$0 \leq \alpha \leq \{1/(Z-1)^2\}$$

where Z is a maximum gradation level, and a is a parameter of brightness of ambient environment.

4. The liquid crystal display according to claim 1, wherein the diffusion member is arranged between the second retardation plate and the second polarizer, or between the second substrate and the second retardation plate.

5. The liquid crystal display according to claim 1, wherein the liquid crystal layer is of a vertical alignment (VA) mode.

6. The liquid crystal display according to claim 1, wherein a thickness of the liquid crystal layer in the reflective area is same as a thickness of the liquid crystal layer in the transmissive area.

7. The liquid crystal display according to claim 1, further comprising a control unit configured to receive three-color gradation data of red, green, and blue, convert the three-color gradation data into four-color gradation data of red, green, blue, and white, and drive the first to fourth sub-pixels using the four-color gradation data,
   wherein the control unit sets a gradation level of the fourth sub-pixel to zero when displaying a plurality of primary colors including red, green, blue, cyan, magenta, and yellow, and
   the control unit sets all of the first to fourth sub-pixels to a maximum gradation level when displaying white.

8. The liquid crystal display according to claim 7, wherein the control unit increases the gradation level of the fourth sub-pixel as color purity of each of the primary colors decreases.

9. The liquid crystal display according to claim 7, further comprising a sensor configured to measure brightness of ambient environment,
   wherein the control unit increases the gradation level of the fourth sub-pixel as the brightness increases.

* * * * *

UNITED STATES PATENT AND TRADEMARK OFFICE
CERTIFICATE OF CORRECTION

PATENT NO. : 10,895,779 B2  
APPLICATION NO. : 16/522153  
DATED : January 19, 2021  
INVENTOR(S) : Norihiro Arai et al.

Page 1 of 1

It is certified that error appears in the above-identified patent and that said Letters Patent is hereby corrected as shown below:

In the Claims

Column 18, Line 11 (approx.):
In Claim 3, delete "$D_W = -aX^2 + \{1+a(Z-1)\}X$" and insert -- $D_W = -\alpha X^2 + \{1+\alpha(Z-1)\}X$ --, therefor.

Column 18, Line 16 (approx.):
In Claim 3, after "graduation level, and" delete "a" and insert -- $\alpha$ --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*